United States Patent
Cordeiro et al.

(10) Patent No.: US 10,034,218 B2
(45) Date of Patent: Jul. 24, 2018

(54) APPARATUS, SYSTEM AND METHOD OF COMMUNICATING A SHORT SECTOR SWEEP (SSW) PACKET

(71) Applicant: INTEL IP CORPORATION, Santa Clara, CA (US)

(72) Inventors: Carlos Cordeiro, Portland, OR (US); Assaf Kasher, Haifa (IL); Solomon B. Trainin, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 71 days.

(21) Appl. No.: 15/199,468

(22) Filed: Jun. 30, 2016

(65) Prior Publication Data

US 2018/0007607 A1    Jan. 4, 2018

(51) Int. Cl.
| | |
|---|---|
| *H04W 40/02* | (2009.01) |
| *H04W 16/28* | (2009.01) |
| *H04L 12/721* | (2013.01) |
| *H04B 7/06* | (2006.01) |
| *H04B 7/08* | (2006.01) |

(52) U.S. Cl.
CPC .......... *H04W 40/02* (2013.01); *H04B 7/0851* (2013.01); *H04L 45/72* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 8,335,167 B1 | 12/2012 | Zhang et al. | |
| 2010/0214169 A1* | 8/2010 | Kafle | H01Q 3/26 342/368 |
| 2012/0108281 A1 | 5/2012 | Niu et al. | |
| 2014/0206304 A1 | 7/2014 | Zhang et al. | |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Diane Lo
(74) *Attorney, Agent, or Firm* — Shichrur & Co.

(57) ABSTRACT

Some demonstrative embodiments include apparatuses, devices, systems and methods of communicating a short Sector Sweep (SSW) packet. For example, an apparatus may include circuitry and logic configured to cause a first wireless station to generate a short Sector Sweep (SSW) packet including at least a packet type field, a countdown field, a short SSW feedback field, and a direction field, the packet type field including a value to indicate a Short SSW packet type, the countdown field including a counter value to indicate a number of remaining short SSW packet transmissions, the direction field to indicate whether transmission of the short SSW packet is from a beamforming initiator or a beamforming responder; and to transmit the short SSW packet to a second wireless station over a directional frequency band during beamforming training between the first and second wireless stations.

25 Claims, 6 Drawing Sheets

(56) References Cited

U.S. PATENT DOCUMENTS

| | | | | |
|---|---|---|---|---|
| 2015/0289147 A1* | 10/2015 | Lou | ................... | H04B 7/0408 |
| | | | | 370/329 |
| 2016/0105260 A1* | 4/2016 | Zhang | ................ | H04L 1/0083 |
| | | | | 370/329 |
| 2017/0222704 A1* | 8/2017 | Eitan | .................. | H04B 7/0478 |
| 2017/0302349 A1* | 10/2017 | Sun | ................... | H04B 7/0617 |
| 2017/0317727 A1* | 11/2017 | Wang | ................ | H04B 7/0452 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2017/034908, dated Sep. 6, 2017, 13 pages.

Alecsander Eitan et al., 'Short SSW Format for 11ay', IEEE 802.11-16/0416-01-00, Mar. 16, 2016, 12 pages.

\* cited by examiner

APPARATUS, SYSTEM AND METHOD OF COMMUNICATING A SHORT SECTOR SWEEP (SSW) PACKET

TECHNICAL FIELD

Embodiments described herein generally relate to communicating a short Sector Sweep (SSW) packet.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

The beamforming procedure may include a Sector Level Sweep (SLS) procedure.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
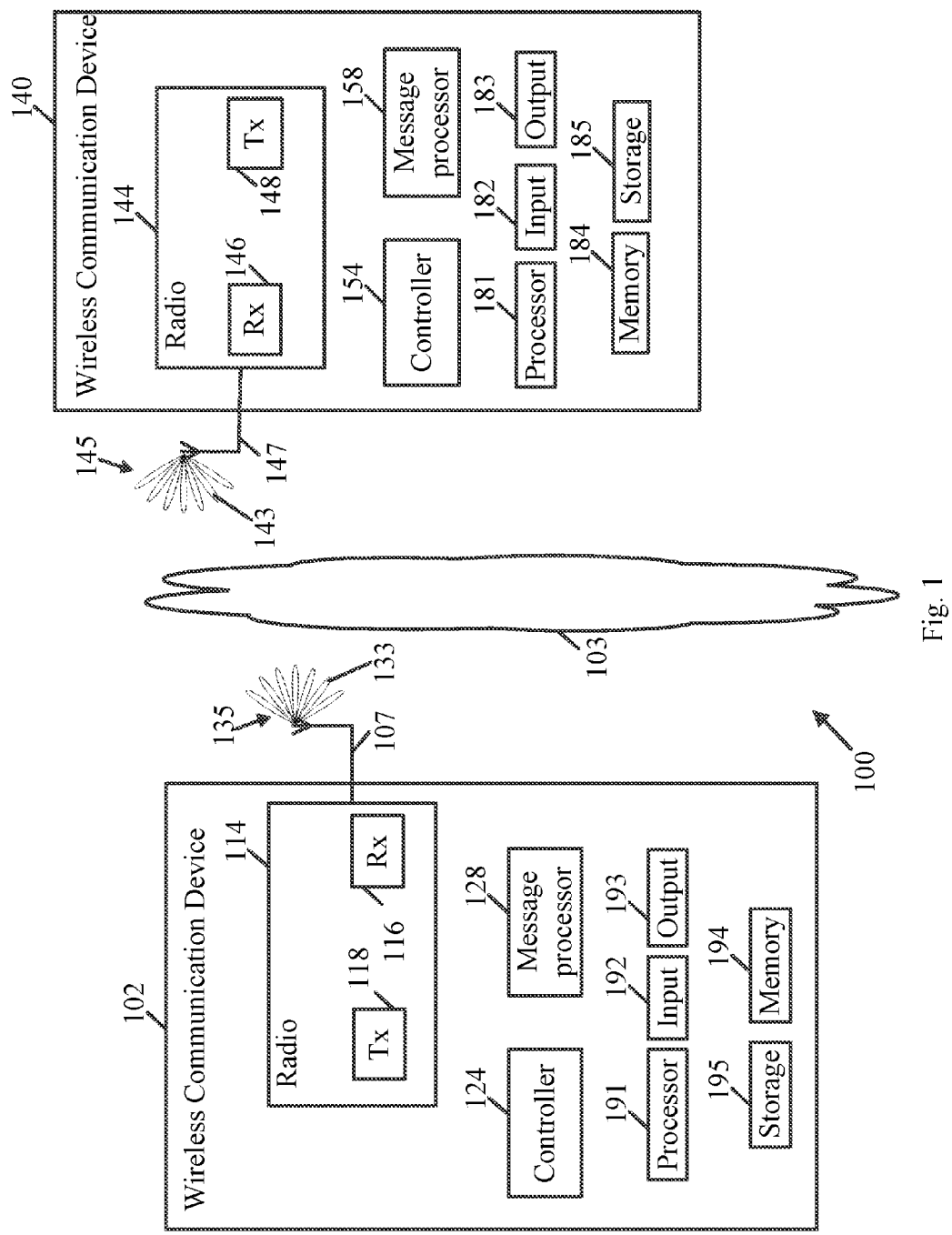
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012); IEEE802.11ac-2013 (*"IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December,* 2013); IEEE 802.11ad (*"IEEE P802.11ad-2012, IEEE Standard for Information Technology—Telecommunications and Information Exchange Between Systems—Local and Metropoli-* tan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("*IEEE 802.11-REVmc™/ D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications*—Amendment: Enhanced Throughput for Operation in License-*Exempt Bands Above 45 GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.5, Aug. 4, 2014*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, mory (shared, dedicated, dedicated, or group), and/or me group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may operate as and/or perform one or more functionalities of any other wireless device and/or station, e.g., a WLAN STA, a WiFi STA, and the like.

In some demonstrative embodiments, device 102 and/or device 140 may be configured to operate as, perform a role of, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform a role of, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform a role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions. For example, antenna 107 may be steered to a plurality of beam directions 135, and/or antenna 147 may be steered to a plurality of beam directions 145. For example, device 102 may transmit a directional transmission to device 140, and/or device 140 may transmit a directional transmission to device 102.

In some demonstrative embodiments, device 102 and/or device 140 may select a pair of beams including a first beam direction of the plurality of beam directions 135, e.g., including a direction 133, and a second beam direction of the plurality of beam directions 145, e.g., including a direction 143, to communicate between devices 102 and 140, for example, via a mmWave wireless communication link and/or any other link.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some demonstrative embodiments may be implemented, for example, as part of a new standard in an mmWave band, e.g., a 60 GHz frequency band or any other directional band, for example, as an evolution of an *IEEE 802.11ad standard*.

In some demonstrative embodiments, devices 102 and/or 140 may be configured according to one or more standards, for example, in accordance with an *IEEE 802.11ay Standard*, which may be, for example, configured to enhance the efficiency and/or performance of an *IEEE 802.11ad Specification*, which may be configured to provide Wi-Fi connectivity in a 60 GHz band.

Some demonstrative embodiments may enable, for example, to significantly increase data transmission rates defined in the *IEEE 802.11ad specification*, which may, for example, satisfy growing demand in network capacity for new coming applications.

Some communications over a wireless communication band, for example, a DMG band or any other band, may be performed over a single channel bandwidth (BW). For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an *IEEE 802.11ad Specification*, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may be configured to support one or more mechanisms and/or features, for example, channel bonding, single user (SU) MIMO, and/or and multi user (MU) MIMO, for example, in accordance with an *IEEE 802.11ay Standard* and/or any other standard and/or protocol.

In some demonstrative embodiments, devices 102 and/or 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In one example, an EDMG STA may include a DMG STA whose radio transmitter is capable of transmitting and receiving EDMG physical layer (PHY) protocol data units (PPDUs). The EDMG STA may perform any other additional or alternative functionality.

In some demonstrative embodiments, devices 102 and/or 140 may include EDMG STAs capable of communicating in an EDMG BSS.

In some demonstrative embodiments, devices 102 and/or 140 may be configured to support the one or more mechanisms and/or features in a backwards compatible manner, e.g., in a manner which may be compatible with one or more devices ("legacy devices"), which may not support these mechanisms and/or features, e.g., one or more non-EDMG stations, for example, stations configured according to an *IEEE 802.11ad Standard*, and the like.

In one example, a legacy station (STA), for example, a DMG STA, may include, may comply with, and/or may be configured according to, a first specification, for example, an *IEEE 802.11ad Specification*, while a non-legacy station (STA), for example, an EDMG STA, may include, may comply with, and/or may be configured according to, a second specification, for example, an *IEEE 802.11ay Specification*, or any other Specification.

In some demonstrative embodiments, devices 102 and/or 140 may be configured to be able to communicate in a deployment, scenario, and/or implementation ("mixed scenario"), which may include both one or more legacy STAs as well as one or more non-legacy STAs, e.g., as described below.

In some demonstrative embodiments, communication over a mmWave band, for example, a DMG band, for example, a 60 GHz band may be directional.

In some demonstrative embodiments, a beamformed link between two stations (STAs), e.g., devices 102 and/or 140, may be established, for example, before data communication may take place between the two STAs.

In some demonstrative embodiments, device 102 and/or device 140 may be configured to select a pair of beams including a first beam direction of the plurality of beam directions 135, e.g., including a direction 133, and a second beam direction of the plurality of beam directions 145, e.g., including a direction 143, to communicate between devices 102 and 140 via a mmWave wireless communication link.

In some demonstrative embodiments, device 102 and/or device 140 may perform a beamforming (BF) procedure (also referred to as "beamforming training", "beamforming training protocol", or "beamforming protocol"), for example, to select the pair of beams including beam directions 133 and 143.

In some demonstrative embodiments, one device of system 100 may operate as a beamforming initiator (BI) and another device of system 100 may operate as a beamforming responder (BR) to perform beamforming between the BI and the BR. For example, wireless communication device 102 may operate as and/or perform the role of the BI, and/or wireless communication device 140 may operate as and/or perform the role of the BR.

In other embodiments, wireless communication device 140 may operate as and/or perform the role of the BI, and/or wireless communication device 102 may operate as and/or perform the role of the BR.

In some demonstrative embodiments, the beamforming procedure may include a Sector level sweep (SLS) phase or protocol (also referred to as sector sweep (SSW) procedure), e.g., including, for example, an Initiator Sector Sweep (ISS), which may include a sector sweep performed, for example, by the Beamforming initiator, and a responder sector sweep (RSS), which may include a sector sweep performed, for example, by the Beamforming responder. The RSS may, for example, follow the ISS.

In some demonstrative embodiments, the beamforming procedure may include a Beam Refinement Protocol (BRP) phase, e.g., following the SLS phase In some demonstrative embodiments, device 102 and/or device 140 may opt to perform the BRP phase.

Some demonstrative embodiments are described herein with respect to a BRP, which may be performed after a SLS phase of a beamforming procedure. However, in other embodiments, BRP may be performed as part of any other additional or alternative phase and/or procedure.

In some demonstrative embodiments, device 102 and/or device 140 may exchange a plurality of BRP frames during the BRP phase. For example, device 102 may transmit one or more, e.g., a plurality of, BRP frames to device 140, and/or device 140 may transmit one or more, e.g., a plurality of, BRP frames to device 102.

In some demonstrative embodiments, during the SSW procedure the two stations, e.g., device 102 and/or device 140, may exchange transmissions over different antenna sectors, e.g., to determine a combination of sectors that provides a highest signal quality, for example, to determine the beam directions 133 and 143.

In some demonstrative embodiments, during the BRP phase the two stations, e.g., devices 102 and/or 140, may exchange the plurality of BRP frames, for example, to "fine-tune" the coarse sectors.

Figure 2:
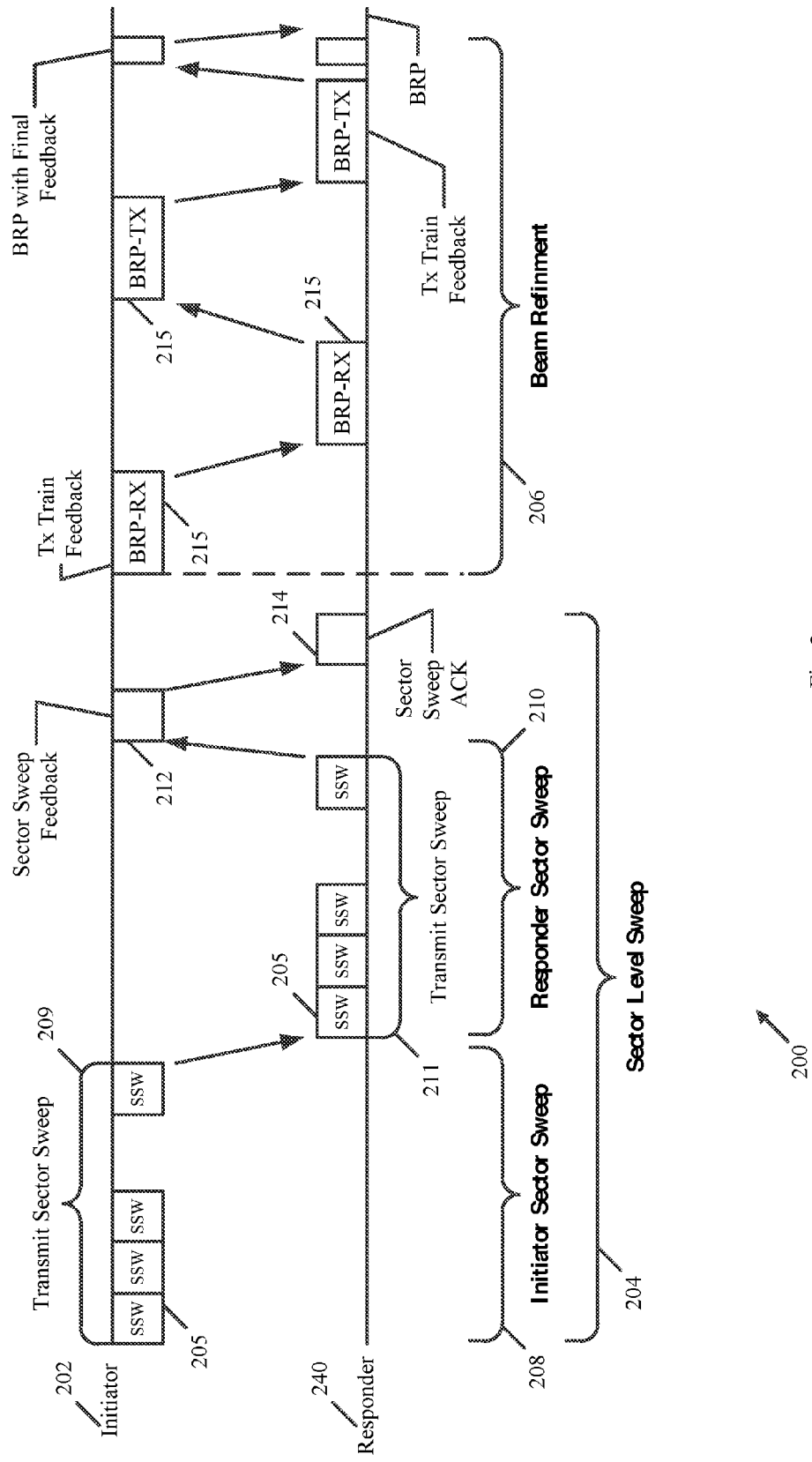
FIG. 2 is a schematic illustration of a beamforming training protocol, which may be implemented in accordance with some demonstrative embodiments.

Reference is made to FIG. 2, which schematically illustrates a beamforming protocol 200 between a BI 202 and a BR 240, in accordance with some demonstrative embodiments. For example, device 102 (FIG. 1) may be configured to operate as, perform a role of, and/or perform one or more functionalities of, BI 202, and/or device 140 (FIG. 1) may be configured to operate as, perform a role of, and/or perform one or more functionalities of BR 240.

In some demonstrative embodiments, BI 202 and BR 240 may perform beamforming protocol 200, for example, to select the pair of beam directions, e.g. the pair of beam directions 133 and 143 (FIG. 1).

As shown in FIG. 2, beamforming protocol 200 may include two phases, e.g., a Sector Level Sweep (SLS) phase 204, and a beam refinement protocol (BRP) 206.

In some demonstrative embodiments, as shown in FIG. 2, BI 202 and BR 240 may first perform SLS phase 204, for example, to discover coarse sectors for communication.

In some demonstrative embodiments, as shown in FIG. 2, BI 202 and BR 240 may perform BRP phase 206, for example, once SLS phase 204 is complete.

In some demonstrative embodiments, BI 202 and BR 240 may perform the BRP phase 206, for example, to fine-tune the coarse sectors.

In one example, BI 202 and BR 240 may opt to perform BRP phase 206, e.g., one or more times, for example, to achieve higher Signal to Noise Ratio (SNR) and/or to achieve any other goal, and/or based on any other condition and/or criterion.

As shown in FIG. 2, BI 202 and BR 204 may communicate a plurality of Sector Level Sweep (SLS) frames 205 (also referred to as "Sector Sweep (SSW) frames) during SLS phase 204, for example, to discover coarse sectors for communication.

As shown in FIG. 2, SLS phase 204 may include an Initiator Sector Sweep (ISS) 208, which may include a sector sweep performed, for example, by BI 202.

As shown in FIG. 2, BI 202 may transmit SSW frames 205 during Initiator Sector Sweep (ISS) 208, for example, by performing a transmit sector sweep (Tx SSW) 209.

As shown in FIG. 2, SLS phase 204 may include a Responder Sector Sweep (RSS) 210, which may include a sector sweep performed, for example, by BR 240.

As shown in FIG. 2, BR 240 may transmit SSW frames 205 during Responder Sector Sweep (RSS) 210, for example, by performing a transmit sector sweep (Tx SSW) 211.

As shown in FIG. 2, BI 202 may transmit a Sector Sweep Feedback frame 212 to BR 240, and BR 240 may transmit a Sector Sweep acknowledge (ACK) frame 214, e.g., to acknowledge receipt of Sector Sweep Feedback frame 212.

As shown in FIG. 2, BI 202 and BR 204 may communicate a plurality of BRP frames 215 during the BRP phase 206, for example, to fine-tune the coarse sectors.

Referring back to FIG. 1, in some demonstrative embodiments, devices 102 and 140 may perform a beamforming training procedure, e.g., according to beamforming protocol 200 and/or any additional communications and/or operations of one or more additional or alternative beamforming protocols, for example, to establish a wireless communication link between devices 102 and 140.

In some demonstrative embodiments, the wireless communication link may include a directional wireless communication link.

In some demonstrative embodiments, the wireless communication link may include a DMG link, e.g., an EDMG link.

In some demonstrative embodiments, one or more devices in a network, e.g., in an EDMG BSS, for example, devices 102 and/or 140, may implement antenna arrays including a large number of antenna elements, e.g., compared to a number of antenna arrays and/or elements implemented by legacy wireless stations, e.g., which may operate in accordance with a *IEEE 802.11ad Specification*.

In some demonstrative embodiments, a larger number of antenna arrays and/or elements may enable stations, e.g., EDMG stations, to utilize higher data rates, for example, data rates higher than 20 Gigabits per second (Gbps).

In some demonstrative embodiments, a duration of a beamforming procedure between two stations may depend, for example, at least on a number of antenna arrays and/or elements implemented by the stations, e.g., since the number of SSW packets communicated during the sector sweep may depend on the number of antenna arrays and/or elements implemented by the stations. For example, the duration of the beamforming procedure may increase, for example, as the number of antenna elements increases.

In some demonstrative embodiments, a total duration of beamforming procedures performed between a plurality of stations in a network, e.g., between an AP STA and a plurality of stations, may increase as the number of stations increases, and as the number of antenna arrays and/or elements implemented by the stations increases.

Figure 3:
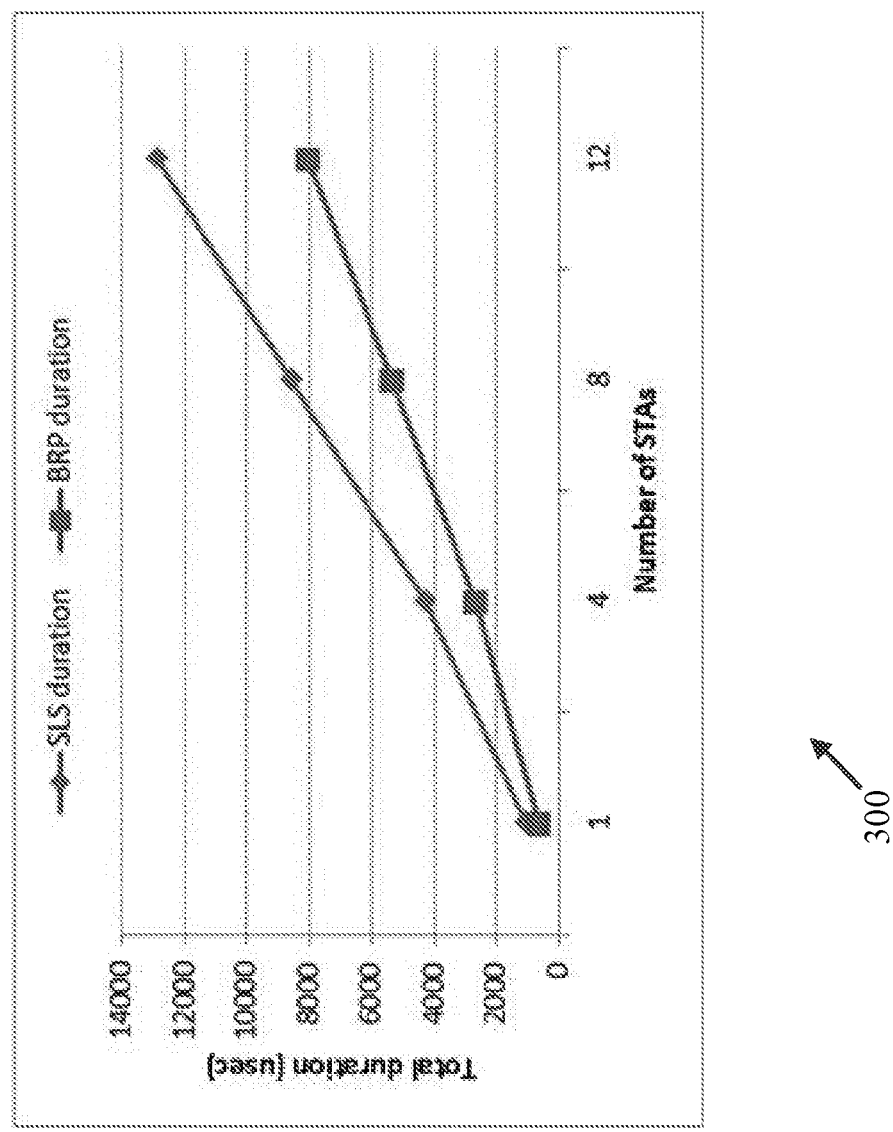
FIG. 3 is a schematic illustration of a graph depicting a total duration of a beamforming training procedure versus a number of stations participating in the beamforming training procedure.

Reference is made to FIG. 3, which schematically illustrates a graph 300 depicting a total duration of beamforming training procedure versus a number of stations participating in the beamforming training procedure.

For example, graph 300 may represent a total duration of a beamforming protocol, e.g., beamforming protocol 200 (FIG. 2), which may be performed between a plurality of wireless stations, for example, when 32 antenna elements are implemented per station.

As shown in FIG. 3, the total duration of the beamforming procedure 200 (FIG. 2) may increase as the number of STAs increases.

In some demonstrative embodiments, some stations, e.g., EDMG stations, may implement a large number of antenna elements, e.g., between 128 antenna elements and 1000 or more antenna elements, and/or any other number of antenna elements. Accordingly, there may be a need for a mechanism, which may enable to ensure that a duration of a beamforming procedure e.g., beamforming procedure 200 (FIG. 2), when performed such stations will not be considerably high and/or impractical, e.g., in some use cases, deployments and/or scenarios.

Referring back to FIG. 1, in some demonstrative embodiments, devices 102 and/or 140 may be configured to implement one or more mechanism, which may enable, for example, increase an efficiency of a beamforming procedure, for example, beamforming procedure 200 (FIG. 2), e.g., as described below.

In some demonstrative embodiments, devices 102 and/or 140 may be configured to enable a Physical (PHY) layer of a station to transmit beamforming training frames, for example, even without any intervention or overhead caused by a media access control (MAC) layer, e.g., as described below.

In some demonstrative embodiments, transmitting the beamforming training frames by the PHY may enable, for example, at least to reduce a size of the beamforming training frames. For example, the beamforming training frames may be processed and/or communicated, for example, even if the beamforming frames do not include a MAC header, e.g., as described below.

In some demonstrative embodiments, transmitting the beamforming training frames by the PHY may enable, for example, at least to reduce turnaround times, for example, since no MAC processing of the beamforming training frames may be required, e.g., as described below.

In some demonstrative embodiments, transmitting the beamforming training frames by the PHY may enable, for example, at least to reduce the duration of the beamforming procedure, for example, in some cases, by approximately forty percent, e.g., as described below.

In some demonstrative embodiments, it may not be advantageous and/or efficient to use a predefined PHY frame format, e.g., a Non-Data Packet (NDP) and/or a NDP Announcement frame, for example, as the new PHY frame may not be suitable for communication in a DMG network, e.g., since beamforming training in the DMG band may be required even before an NDP Announcement frame can be transmitted.

In some demonstrative embodiments, it may not be advantageous and/or efficient to use a short SSW MAC frame, for example, at least since such a solution does not provide an extensible and/or a generic mechanism to enable the PHY to transmit the beamforming training frames, for example, without the MAC involvement, and does not support a reverse sector sweep.

In some demonstrative embodiments, devices 102 and/or 140 may be configured to utilize a short SSW packet which may be transmitted, received and/or processed by the PHY, for example, even without any involvement of the MAC, e.g., as described below.

In some demonstrative embodiments, devices 102 and/or 140 may be configured to utilize the short SSW packet as part of a beamforming procedure, e.g., beamforming procedure 200 (FIG. 2), and/or any other beamforming procedure.

In some demonstrative embodiments, devices 102 and/or 140 may be configured to perform a beamforming procedure, e.g., beamforming procedure 200 (FIG. 2), by exchanging short SSW packets. For example, SSW frames 205 (FIG. 2) may include short SSW packets.

In some demonstrative embodiments, devices 102 and/or 140 may be configured to generate a short SSW packet, e.g., as described below.

In some demonstrative embodiments, devices 102 and/or 140 may be configured to transmit and/or to process the short SSW packet, e.g., as described below.

In some demonstrative embodiments, devices 102 and/or 140 may be configured to receive and/or process the short SSW packet, e.g., as described below.

In some demonstrative embodiments, devices 102 and/or 140 may be configured to communicate the short SSW packet during an SLS, e.g., as described below.

In some demonstrative embodiments, devices 102 and/or 140 may be configured to communicate the short SSW packet during a transmit SLS. In other embodiments, devices 102 and/or 140 may be configured to communicate the short SSW packet during a receive sector sweep, and/or any other sector sweep or other type of operation, communication, and/or procedure.

In some demonstrative embodiments, devices 102 and/or 140 may be configured to transmit, receive and/or process the short SSW packet, for example, even without intervention of a MAC layer, e.g., as described below.

In some demonstrative embodiments, devices 102 and/or 140 may be configured to generate, transmit, receive, and/or process the short SSW packet, for example, at a Directional Multi-Gigabit (DMG) Control Physical Layer (PHY) mode, e.g., as described below.

In some demonstrative embodiments, devices 102 and/or 140 may be configured to generate, transmit, receive and/or process the short SSW packet as a PHY layer frame including no MAC header, e.g., as described below.

In some demonstrative embodiments, the short SSW packet may include at least a packet type field, a countdown field, a short SSW feedback field, and/or a direction field, e.g., as described below.

In some demonstrative embodiments, the packet type field may include a value to indicate a short SSW packet type, e.g., as described below.

In some demonstrative embodiments, the countdown field may include a counter value to indicate a number of remaining short SSW packet transmissions e.g., as described below.

In some demonstrative embodiments, the direction field may indicate whether transmission of the short SSW packet is from a beamforming initiator or a beamforming responder, e.g., as described below.

In some demonstrative embodiments, the short SSW packet may include an addressing field to indicate an address of a sender of the short SSW packet, and/or an address of a recipient of the short SSW packet, e.g., as described below.

In some demonstrative embodiments, the short SSW packet may include an Radio-Frequency (RF) chain identifier (ID) field, which may include, for example, an indication of an RF chain of a wireless station, which is to transmit the short SSW packet, e.g., as described below.

In some demonstrative embodiments, the short SSW packet may include a Frame Check Sequence (FCS) field.

In some demonstrative embodiments, the FCS field may include a partial value of an FCS value corresponding to contents of the short SSW packet, In some demonstrative embodiments, the FCS filed may include, for example, four Most Significant Bits (MSBs) of the FCS value. In other embodiments, the FCS field may have any other size and/or may include any other value corresponding to the FCS value.

In some demonstrative embodiments, the short SSW packet may include the packet type field, the addressing field, the countdown field, the RF chain ID field, the short SSW feedback field, the direction field, and the FCS field, e.g., as described below.

In other embodiments, the short SSW may include only some of the packet type field, the addressing field, the countdown field, the RF chain ID field, the short SSW feedback field, the direction field, and/or the FCS field, and/or one or more additional or alternative fields and/or values.

Figure 4:
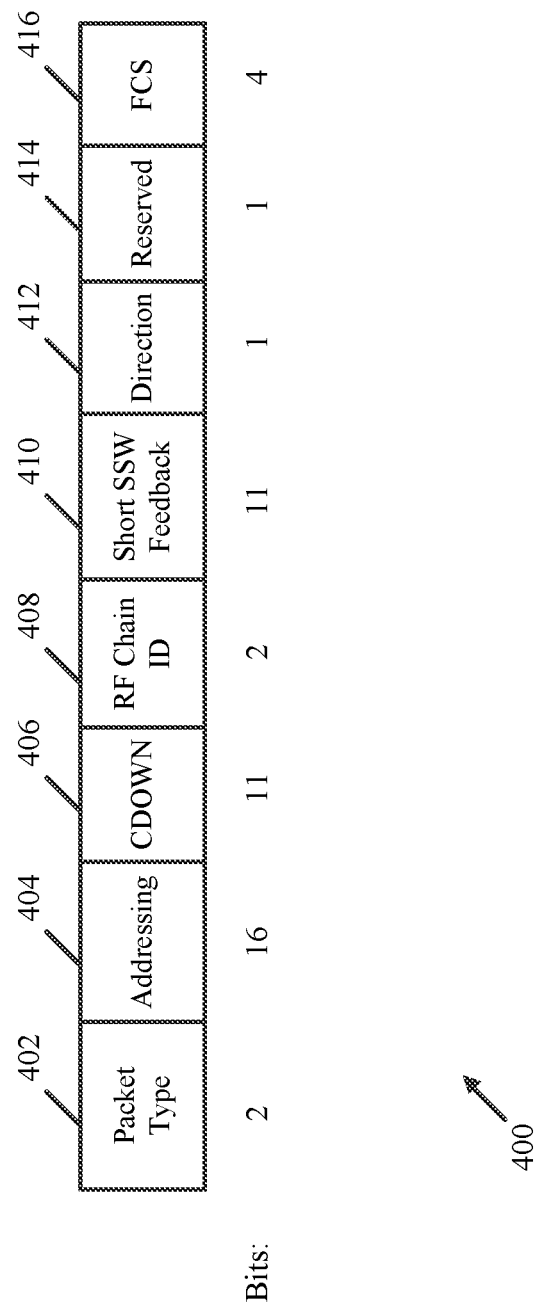
FIG. 4 is a schematic illustration of a structure (format) of a short Sector Sweep (SSW) packet, in accordance with some demonstrative embodiments.

Reference is made to FIG. 4, which schematically illustrates a structure (format) of a short SSW packet 400, in accordance with some demonstrative embodiments. For example, device 102 (FIG. 1) and/or device 140 (FIG. 1) may be configured to generate, transmit, receive and/or process one or more short SSW packets having the format of short SSW packet, and/or including one or more of the fields of short SSW packet 400, e.g., as described below.

In some demonstrative embodiments, as shown in FIG. 4, short SSW packet 400 may include a packet type field 402.

In some demonstrative embodiments, as shown in FIG. 4, packet type field 402 may include two bits. In other embodiments, packet type field 402 may include any other number of bits.

In some demonstrative embodiments, packet type field 402 may include a value to indicate a Short SSW packet type.

In one example, packet type field 402 may include a value 0 to indicate the Short SSW packet type, and/or one or more other values, e.g., values 1-3, may be reserved and/or may be utilized to indicate one or more other packet types.

In some demonstrative embodiments, the one or more reserved values of Packet Type field 402 may enable, for example, to define one or more additional types of packets, and/or may enable to extend the structure of short SSW packet 400.

In some demonstrative embodiments, as shown in FIG. 4, short SSW packet 400 may include an addressing field 404.

In some demonstrative embodiments, as shown in FIG. 4, addressing field 404 may include 16 bits. In other embodiments, addressing field 404 may include any other number of bits.

In some demonstrative embodiments, addressing field 404 may indicate an address of a transmitter of the short SSW packet 400 ("the transmitter station"), and/or an address of a receiver of short SSW packet 400 ("the receiver station").

In some demonstrative embodiments, addressing field 404 may include value, e.g., a hash function, representing both the address of the transmitter station and the address of the receiver station. For example, addressing field 404 may include a hash function of a MAC address of the transmitter station, a MAC address of the receiver station, and a scrambler seed. In other embodiments, addressing field may include any other value, e.g., a hash value or any other value, representing the address of the transmitter station and the address of the receiver station.

In some demonstrative embodiments, a probability of false alarm, e.g., when using the hash function, may be low. However, when using the hash function there may be a search complexity at the receiver station, for example, to undo the hash function and/or to search for the MAC addresses.

In some demonstrative embodiments, addressing field 404 may include at least one Association Identifier (AID) representing the address of the transmitter station and the address of the receiver station. For example, addressing field 404 may include a concatenation of an AID of the transmitter station and an AID of the receiver station.

In one example, addressing field 404 may include an 8bis AID of the transmitter station and an 8-bit AID of the receiver station. According to this example, the concatenation of 8-bit AID of the transmitter with the 8-bit AID of the receiver station may have a size of 16 bits, which may fit a 16-bit addressing field 404. The AID values may be implemented for addressing field 404, for example, after association of the transmitter station to a BSS.

In other embodiments, the addressing field 404 may include any other value and/or format to indicate the transmitter station and/or the receiver station.

In some demonstrative embodiments, as shown in FIG. 4, short SSW packet 400 may include a countdown field 406, denoted CDOWN.

In some demonstrative embodiments, as shown in FIG. 4, countdown field 406 may include 11 bits. In other embodiments, countdown field 406 may include any other number of bits.

In some demonstrative embodiments, countdown field 406 may include a counter value to indicate a number of remaining short SSW packet transmissions.

In some demonstrative embodiments, the counter value in filed 406 may indicate the number of remaining SSW packet transmissions and Long Backoff Inter-Frame Spaces (LBIFSs) to an end of a sector sweep across all antennas of the transmitter station.

In some demonstrative embodiments, an LBIFS may be based on a transmit time, denoted TXTIME(Short SSW), of the short SSW packet 400, and a spacing, e.g., am Short Beamforming Inter-message Space (SBIFS), between beamforming messages.

In one example, an LBIFS may be determined, e.g., as follows:

$$LBIFS = 2 \times TXTIME(\text{Short } SSW) + 2 \times SBIFS \quad (1)$$

In some demonstrative embodiments, the transmitter station may increase the value in the CDOWN field 406, for example, by two, e.g., for each LBIFS contained as part of a sector sweep, e.g., based on the LBIFS calculation of Equation 1.

In some demonstrative embodiments, the transmitter station may set the value in the countdown filed 406 to zero, for example, in a last short SSW packet transmission.

In some demonstrative embodiments, as shown in FIG. 4, short SSW packet 400 may include an RF chain ID field 408.

In some demonstrative embodiments, as shown in FIG. 4, RF chain ID field 408 may include 2 bits. In other embodiments, RF chain ID field 408 may include any other number of bits.

In some demonstrative embodiments, RF chain ID field 408 may indicate an RF chain of the transmitter station to transmit the short SSW packet 400.

In some demonstrative embodiments, as shown in FIG. 4, short SSW packet 400 may include a short SSW feedback field 410.

In some demonstrative embodiments, as shown in FIG. 4, short SSW feedback field 410 may include 11 bits. In other embodiments, short SSW field 410 may include any other number of bits.

In some demonstrative embodiments, short SSW packet 400 may support, for example, a reverse sector sweep, for example, RSS 210 (FIG. 2), e.g., by including the Short SSW Feedback field 410 in short SSW packet 400.

In some demonstrative embodiments, SSW feedback field 410 may include one or more feedback values, for example, which may be transmitted, e.g., by a BR, in an SSW packet during an RSS, e.g., RSS 210 (FIG. 2).

In some demonstrative embodiments, short SSW feedback field 410 may include a value of a countdown field 406 of a previous short SSW packet received in a previous sector sweep, for example, if short SSW packet 400 is transmitted, e.g., by BR 240 (FIG. 2), during an RSS, e.g., RSS 210 (FIG. 2). In some demonstrative embodiments, the previous short SSW packet may include a short SSW packet having a best quality of a plurality of short SSW packets in the previous sector sweep.

For example, the previous sector sweep may include an ISS, e.g., ISS 208 (FIG. 2). For example, the value of the countdown field 406 of the previous short SSW packet received in the previous sector sweep may include a value of a countdown field 406 of an SSW packet 205 (FIG. 2) received by the BR during the ISS 208 (FIG. 2). For example, using SSW feedback field 410 to indicate the value of the countdown field 406 of the previous short SSW packet received in the previous sector sweep may enable the BR to indicate to the BI a best Tx sector of the BI, for example, based on ISS 208 (FIG. 2).

In some demonstrative embodiments, short SSW feedback field 410 may include a reserved value, for example, if short SSW packet 400 is transmitted during an ISS, e.g., ISS 208 (FIG. 2).

In some demonstrative embodiments, as shown in FIG. 4, short SSW packet 400 may include a direction field 412.

In some demonstrative embodiments, as shown in FIG. 4, direction field 412 may include 1 bit. In other embodiments, direction filed 412 may include any other number of bits.

In some demonstrative embodiments, the direction field 412 may indicate whether transmission of the short SSW packet 400 is from a beamforming initiator or a beamforming responder.

In some demonstrative embodiments, the direction field 412 may include a one-bit field having either a value of zero, e.g., to indicate transmission by the beamforming initiator, or a value of one, e.g., to indicate transmission by the beamforming responder. In other embodiments, direction field 412 may utilize any other value and/or format to indicate whether transmission of the short SSW packet 400 is from a beamforming initiator or a beamforming responder.

In some demonstrative embodiments, as shown in FIG. 4, short SSW packet 400 may include a reserved field 414.

In some demonstrative embodiments, as shown in FIG. 4, reserved field 414 may include 1 bit. In other embodiments, reserved filed 414 may include any other number of bits, or may be omitted.

In some demonstrative embodiments, as shown in FIG. 4, short SSW packet 400 may include a Frame Check Sequence (FCS) field 416.

In some demonstrative embodiments, as shown in FIG. 4, FCS field 416 may include 4 bits. In other embodiments, FCS filed 414 416 include any other number of bits.

In some demonstrative embodiments, FCS field 416 may represent an FCS value corresponding to contents of short SSW packet 400.

In some demonstrative embodiments, FCS field 416 may include four MSBs of the FCS value.

In some demonstrative embodiments, a short SSW packet may have a size of up to 6 octets.

In some demonstrative embodiments, as shown in FIG. 4, short SSW packet 400 may have a size of 6 octets.

In some demonstrative embodiments, using a short SSW packet, e.g., short SSW packet 400, having a size of 6 Octets or less may be advantageous, e.g., in some use cases, scenarios, and/or implementations, for example, to ensure that an extra Low-Density Parity-Check (LDPC) codeword may not be required to process the short SSW packet. Accordingly, using a short SSW packet, e.g., short SSW packet 400, having a size of 6 Octets or less may be advantageous, e.g., in some use cases, scenarios, and/or implementations, for example, to maintain a smallest possible PHY Service Data Unit (PSDU) size.

In some demonstrative embodiments, a Length field in a PHY header of short SSW packet 400 may be set to a value of 6, for example, to enable backward compatibility with legacy wireless stations, e.g., which may operate in accordance with an *IEEE* 802.11*ad Specification*. For example, a legacy wireless station may drop the short SSW packet, for example, since the Length field may be considered by the legacy station to be invalid, e.g., in accordance with the *IEEE* 802.11*ad Specification*.

In some demonstrative embodiments, although the short SSW packet may be dropped, the legacy wireless station may be able to set a Clear Channel Assessment (CCA) busy state for a duration of the SSW short packet 400, for example, based on a detection of a PLCP header of SSW short packet 400.

In some demonstrative embodiments, the size of the fields of short SSW packet 400 may enable to support, for example, up to 2048 antenna sectors. This ability may enable, for example, to meet a requirement of a station having a large number of antenna elements, e.g., in accordance with an *IEEE* 802.11*ay Specification*.

In some demonstrative embodiments, the structure of short SSW packet 400, may enable a station, e.g., a STA implemented by device 102 (FIG. 1) or a station implemented by device 140 (FIG. 1), to transmit short SSW packet 400, for example, using a legacy DMG Control PHY, e.g., even without using an EDMG Control PHY. Accordingly, a size of short SSW packet 400 may be maintained at a reduced, e.g., minimal size.

In some demonstrative embodiments, the structure of short SSW packet 400, may enable a station, e.g., a STA implemented by device 102 (FIG. 1) or a station implemented by device 140 (FIG. 1), to process short SSW packet 400, for example, even without requiring MAC processing.

In some demonstrative embodiments, the structure of short SSW packet 400, may enable a PHY of a station, e.g., a STA implemented by device 102 (FIG. 1) or a station implemented by device 140 (FIG. 1), to manage an beamforming training process, e.g., even without MAC intervention. Accordingly, the structure of short SSW packet 400, may enable to avoid a need to account for a MAC processing delay, e.g., a MAC turnaround time, for processing SSW packets.

In some demonstrative embodiments, one or more of the fields of a short SSW packet, e.g., short SSW packet 400, may be defined to have a format and/or content, e.g., as follows:

TABLE 1

| Field | Definition |
| --- | --- |
| Packet Type | Indicates type of the packet. Possible values: 0: Short SSW 1-3: Reserved |
| Addressing | Either a hash function of the MAC address of the transmitter, receiver and the scrambler seed, or the concatenation of the AID of the receiver and transmitter. An alternative format may be determined. |
| CDOWN | A down-counter indicating the number of remaining Short SSW packet transmissions and LBIFSs to the end of the TXSS/RXSS across all antennas. This field is set to 0 in the last Short SSW packet transmission. |
| RF Chain ID | Identifies the RF chain the transmitter is currently using for this transmission. |
| Short SSW Feedback | In a RSS, contains the value of the CDOWN field of the Short SSW packet that was received with best quality in the immediately preceding sector sweep. The determination of which packet was received with best quality is implementation dependent. This field is reserved when transmitted as part of an ISS. |

TABLE 1-continued

| Field | Definition |
| --- | --- |
| Direction | Indicates the direction of the transmission. The Direction field is set to 0 to indicate that the frame is transmitted by the beamforming initiator and set to 1 to indicate that the frame is transmitted by the beamforming responder. |
| FCS | The four MSBs of the FCS |

Referring back to FIG. 1, in some demonstrative embodiments an EDMG STA, e.g., a station implemented by device 102 and/or a station implemented by 140, may be configured to follow one or more rules for using a short SSW frame, e.g., short SSW frame 400 (FIG. 4), e.g., as described below.

In some demonstrative embodiments, a Short SSW packet shall be transmitted using the DMG Control PHY mode.

In some demonstrative embodiments, an EDMG STA may transmit a Short SSW packet to another EDMG STA. For example, an EDMG STA must first discover that a peer STA is also an EDMG STA, e.g., before transmitting a Short SSW packet to that STA.

In some demonstrative embodiments, for a SLS using Short SSW frames, LBWS is equal to 2*TXTIME(Short SSW)+2*SBIFS, e.g., as described above. Accordingly, an EDMG STA performing an SLS using Short SSW frames shall increase the value of the CDOWN field within the Short SSW frame by two for each LBWS contained as part of a sector sweep, e.g., as described above.

In some demonstrative embodiments, the Length field in the PHY header of the short SSW packet shall be set to 6. This may enable, for example, backward compatibility with legacy devices, e.g., as described above.

In some demonstrative embodiments, transmission of a short SSW packet as part of an SLS shall follow the same procedure as defined in an IEEE 802.11ad Specification.

In some demonstrative embodiments, device 102 may operate as, perform a role of, and/or perform the functionality of a BI, for example, to perform the beamforming procedure 200 (FIG. 2), e.g., by communicating SSW packets including short SSW packet 400 (FIG. 4).

In some demonstrative embodiments, device 140 may operate as, perform a role of, and/or perform the functionality of a BR, for example, to perform the beamforming procedure 200 (FIG. 2), e.g., by communicating SSW packets including short SSW packet 400 (FIG. 4).

In some demonstrative embodiments, device 102 may be configured to generate and transmit the short SSW packet 400 (FIG. 4), for example, during an ISS of the beamforming procedure, e.g., during ISS 208 (FIG. 2).

In some demonstrative embodiments, device 140 may be configured to process the short SSW packet 400 (FIG. 4), which may be received from device 102, for example, during the ISS of the beamforming procedure, e.g., during ISS 208 (FIG. 2).

In some demonstrative embodiments, controller 124 may be configured to control, cause and/or trigger device 102 and/or message processor 128 to generate a short SSW packet 400 (FIG. 4) including at least the packet type field, the countdown field, the short SSW feedback field, and the direction field.

In some demonstrative embodiments, controller 124 may be configured to control, cause and/or trigger device 102 and/or transmitter 118 to transmit the short SSW packet to device 140 over a directional frequency band during beamforming training between devices 102 and 140.

In some demonstrative embodiments, the directional frequency band may include a DMG band.

In some demonstrative embodiments, controller 124 may be configured to control, cause and/or trigger device 102 to transmit the Short SSW packet during the SLS, e.g., during SLS 204 (FIG. 2).

In some demonstrative embodiments, controller 124 may be configured to control, cause and/or trigger device 102 and/or transmitter 118 to transmit the short SSW packet during an ISS, e.g., during ISS 208 (FIG. 2).

In some demonstrative embodiments, controller 124 may be configured to control, cause and/or trigger device 102 to increase the counter value in the countdown field 406 (FIG. 4) of a short SSW packet 400 (FIG. 4), for example, by two, e.g., for each LBIFS in the SLS.

In some demonstrative embodiments, controller 124 may be configured to control, cause and/or trigger device 102 to set the counter value in the countdown field 406 (FIG. 4) of a short SSW packet 400 (FIG. 4) to zero, for example, when the short SSW packet 400 (FIG. 4) is a last short SSW packet in the ISS.

In one example, device 102 may generate and transmit short SSW packet 400 (FIG. 4) when performing the role of the BI. According to this example, controller 124 may be configured to control, cause and/or trigger device 102 to set packet type field 402 (FIG. 4) to include the value zero to indicate the short SSW packet; addressing field 404 (FIG. 4) to include a hash function of the MAC address of device 102, the MAC address of device 140, and the scrambler seed; countdown field 406 (FIG. 4) to include the number of remaining short SSW packet transmissions, e.g., during ISS 208 (FIG. 2); RF chain ID field 408 (FIG. 4) to include an ID of an RF chain of device 102 to be utilized for transmission of the short SSW packet 400 (FIG. 4); short SSW feedback field 410 (FIG. 4) to include the reserved value; and/or direction field 412 (FIG. 4) to include the value zero to indicate the short SSW packet 400 (FIG. 4) is to be transmitted by the BI.

In some demonstrative embodiments, device 140 may receive the short SSW packet, e.g., short SSW packet 400 (FIG. 4), for example, during the ISS of the beamforming procedure, e.g., ISS 208 (FIG. 2).

In some demonstrative embodiments, controller 154 may be configured to control, cause and/or trigger device 140 and/or receiver 146 to process the short SSW packet, e.g., short SSW packet 400 (FIG. 4), received from device 102 over the directional frequency band during the beamforming training between devices 102 and 140.

In some demonstrative embodiments, controller 154 may be configured to control, cause and/or trigger device 140 and/or radio 144 to determine one or more beamforming parameters of device 140, for example, based on the short SSW packet.

In some demonstrative embodiments, controller 154 may be configured to control, cause and/or trigger device 140 and/or radio 144 to determine that a short SSW packet is a last short SSW packet in the ISS, for example, when the countdown value in the countdown field 406 (FIG. 4) of the short SSW packet is set to zero.

In some demonstrative embodiments, device 140 may be configured to generate and transmit a short SSW packet 400 (FIG. 4), for example, during an RSS of the beamforming procedure, e.g., RSS 210 (FIG. 2), which follows the ISS, e.g., ISS 208 (FIG. 2).

In some demonstrative embodiments, device 140 may be configured to generate and transmit the short SSW packet 400 (FIG. 4), for example, after completion of ISS 208 (FIG. 2).

In some demonstrative embodiments, device 102 may be configured to process the short SSW packet 400 (FIG. 4) from device 140, for example, during the RSS of the beamforming procedure, e.g., RSS 210 (FIG. 2).

In some demonstrative embodiments, controller 154 may be configured to control, cause and/or trigger device 140 and/or message processor 158 to generate a short SSW packet including at least the packet type field, the countdown field, the short SSW feedback field, and the direction field.

In some demonstrative embodiments, controller 154 may be configured to control, cause and/or trigger device 140 and/or transmitter 148 to transmit the short SSW packet to device 102 over the directional frequency band during the beamforming training between devices 102 and 140.

In some demonstrative embodiments, controller 154 may be configured to control, cause and/or trigger device 140 to transmit the Short SSW packet during the SLS, e.g., SLS 204 (FIG. 2).

In some demonstrative embodiments, controller 154 may be configured to control, cause and/or trigger device 140 and/or transmitter 148 to transmit the short SSW packet during the RSS, e.g., RSS 210 (FIG. 2).

In some demonstrative embodiments, controller 154 may be configured to control, cause and/or trigger device 140 to increase the counter value in the countdown field 406 (FIG. 4) of a short SSW packet 400 (FIG. 4), for example, by two, e.g., for each LBIFS in the SLS.

In some demonstrative embodiments, controller 154 may be configured to control, cause and/or trigger device 140 to set the counter value in the countdown field 406 (FIG. 4) of a short SSW packet 400 (FIG. 4) to zero, for example, when the short SSW packet 400 (FIG. 4) is a last short SSW packet in the sector sweep, the RSS 210 (FIG. 2).

In some demonstrative embodiments, controller 154 may be configured to control, cause and/or trigger device 140 to include in the short SSW feedback field, e.g., SSW feedback field 410 (FIG. 4), a value of a countdown field of a previous short SSW packet received in a previous sector sweep, e.g., a short SSW packet 400 (FIG. 4) received from device 102 (FIG. 1) during ISS 208 (FIG. 2).

In some demonstrative embodiments, the previous short SSW packet may include a short SSW packet having a best quality of a plurality of short SSW packets in the previous sector sweep, e.g., as described above.

In one example, controller 154 may be configured to control, cause and/or trigger device 140 to include in SSW feedback field 410 (FIG. 4) a countdown value in a short SSW packet 205 (FIG. 2) received during ISS 208 (FIG. 2) having the best quality of the plurality of short SSW packets 205 (FIG. 2).

In one example, device 140 may generate and transmit short SSW packet 400 (FIG. 4), for example, when performing the role of the BR. According to this example, controller 124 may be configured to control, cause and/or trigger device 102 to set packet type field 402 (FIG. 4) to include the value zero to indicate the short SSW packet; addressing field 404 (FIG. 4) to include a hash function of the MAC address of device 140, the MAC address of device 102, and the scrambler seed; countdown field 406 (FIG. 4) to include the number of remaining short SSW packet transmissions, e.g., in the RSS; RF chain ID field 408 (FIG. 4) to include an ID of an RF chain of device 140 to be used to transmit the short SSW packet 400 (FIG. 4); short SSW feedback to include the value of the countdown field of the previous short SSW packet, e.g., the short SSW packet 205 (FIG. 2) received during ISS 208 (FIG. 2) having the best quality; and/or direction field 412 (FIG. 4) to include the value one to indicate the short SSW packet 400 (FIG. 4) is to be transmitted by the BR.

In some demonstrative embodiments, device 102 may receive the short SSW packet, e.g., short SSW packet 400 (FIG. 4), from device 140, for example, during the RSS of the beamforming procedure, e.g., RSS 210 (FIG. 2).

In some demonstrative embodiments, controller 124 may be configured to control, cause and/or trigger device 102 and/or receiver 116 to process the short SSW packet, e.g., short SSW packet 400 (FIG. 4), received from device 140 over the directional frequency band during the beamforming training between devices 102 and 140.

In some demonstrative embodiments, controller 124 may be configured to control, cause and/or trigger device 102 and/or radio 114 to determine one or more beamforming parameters of device 102, for example, based on the short SSW packet.

In some demonstrative embodiments, controller 124 may be configured to control, cause and/or trigger device 102 and/or radio 114 to determine a transmit sector of device 102, for example, based on the short SSW packet. For example, controller 124 may be configured to control, cause and/or trigger device 102 and/or radio 114 to determine the transmit sector, for example, based on the value in the SSW feedback field, which may indicate a transmit sector of device 102 having a best quality for beamforming with device 140.

In some demonstrative embodiments, controller 124 may be configured to control, cause and/or trigger device 102 and/or radio 114 to determine that a received short SSW packet is a last short SSW packet in the RSS 210 (FIG. 2), for example, when the countdown value in the received short SSW packet, e.g., in countdown field 406 (FIG. 4), is set to zero.

In some demonstrative embodiments, implementing short SSW packets 400 (FIG. 4) for communication by devices 102 and 140 during the beamforming training, may enable, for example, at least to reduce a size of the beamforming training frames, and/or may reduce turnover times, for example, since short SSW packets 400 (FIG. 4) may be configured to carry no MAC header, and/or since short SSW packets 400 (FIG. 4) may be processed, e.g., even without requiring MAC processing. Accordingly, in some use cases, scenarios, and/or implementations, a duration of SLS 204 (FIG. 2) may be reduced, for example, by nearly 40%.

Figure 5:
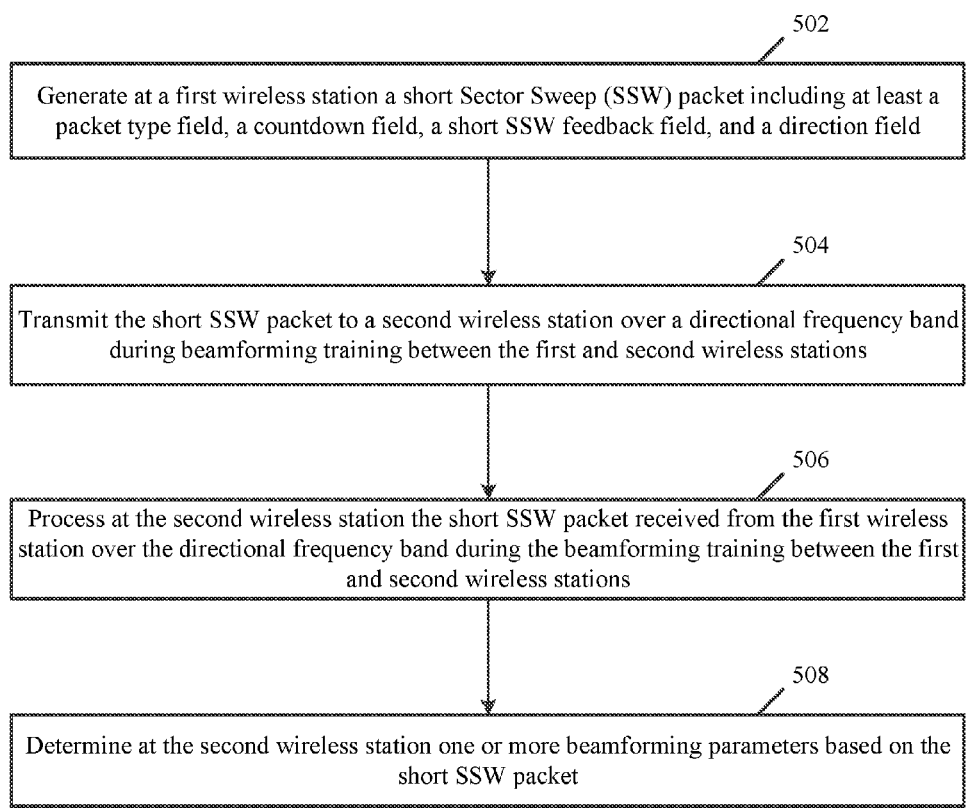
FIG. 5 is a schematic flow-chart illustration of a method of communicating a short Sector Sweep (SSW) packet, in accordance with some demonstrative embodiments.

Reference is made to FIG. 5, which schematically illustrates a method of communicating a short SSW packet, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 502, the method may include generating at a first wireless station a short SSW packet including at least a packet type field, a countdown field, a short SSW feedback field, and a direction field. For example, device 102 (FIG. 1) may generate the short SSW packet, e.g., short SSW packet 400 (FIG. 4), including the packet type field 402, the countdown field 406, the short SSW feedback field 410, and/or the direction field 412 (FIG. 4), e.g., as described above.

As indicated at block 504, the method may include transmitting the short SSW packet to a second wireless station over a directional frequency band during beamforming training between the first and second wireless stations. For example, device 102 (FIG. 1) may transmit the short SSW packet to device 140 (FIG. 1) over the directional frequency band during the beamforming training between devices 102 and 140 (FIG. 1), e.g., as described above.

As indicated at block 506, the method may include processing at the second wireless station the short SSW packet received from the first wireless station over the directional frequency band during the beamforming training between the first and second wireless stations. For example, device 140 (FIG. 1) may process the short SSW packet, e.g., short SSW packet 400 (FIG. 4), received from device 102 (FIG. 1) over the directional frequency band during the beamforming training between devices 102 and 140 (FIG. 1), e.g., as described above.

AS indicated at block 508, the method may include determining one or more beamforming parameters based on the short SSW packet. For example, device 140 (FIG. 1) may determine one or more beamforming parameters of device 140 (FIG. 1), for example, based on the short SSW packet 400 (FIG. 4) received from device 102 (FIG. 1), e.g., as described above.

Figure 6:
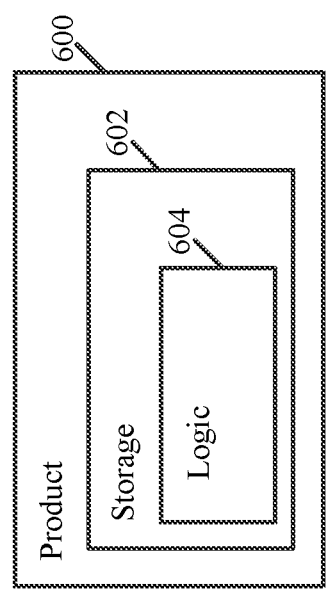
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities as describe d above with reference to FIGS. 1, 2, 3, 4, and/or 5, and/or one or more operations described herein. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to generate a short Sector Sweep (SSW) packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and transmit the short SSW packet to a second wireless station over a directional frequency band during beamforming training between the first and second wireless stations.

Example 2 includes the subject matter of Example 1, and optionally, wherein the apparatus is configured to cause the first wireless station to transmit the short SSW packet during a Responder Sector Sweep (RSS), the short SSW feedback field comprising a value of a countdown field of a previous short SSW packet received in a previous sector sweep.

Example 3 includes the subject matter of Example 2, and optionally, wherein the previous short SSW packet comprises a short SSW packet having a best quality of a plurality of short SSW packets in the previous sector sweep.

Example 4 includes the subject matter of Example 1, and optionally, wherein the apparatus is configured to cause the first wireless station to transmit the short SSW packet during an Initiator Sector Sweep (ISS), the short SSW feedback field comprising a reserved value.

Example 5 includes the subject matter of any one of Examples 1-4, and optionally, wherein the counter value is to indicate the number of remaining SSW packet transmissions and Long Backoff Inter-Frame Spaces (LBIFSs) to an end of a sector sweep across all antennas of the first wireless station.

Example 6 includes the subject matter of Example 5, and optionally, wherein the apparatus is configured to cause the first wireless station to transmit the Short SSW packet during a Sector Level Sweep (SLS), and to increase the counter value by two for each LBIFS in the SLS.

Example 7 includes the subject matter of any one of Examples 1-6, and optionally, wherein the apparatus is configured to cause the first wireless station to set the counter value to zero, when the short SSW packet is a last short SSW packet in a sector sweep.

Example 8 includes the subject matter of any one of Examples 1-7, and optionally, wherein the short SSW packet comprises an addressing field to indicate an address of the first wireless station and an address of the second wireless station.

Example 9 includes the subject matter of Example 8, and optionally, wherein the addressing field comprises a hash function of a Medium Access Control (MAC) address of the first wireless station, a MAC address of the second wireless station, and a scrambler seed.

Example 10 includes the subject matter of Example 8, and optionally, wherein the addressing field comprises a concatenation of an Association Identifier (AID) of the first wireless station and an AID of the second wireless station.

Example 11 includes the subject matter of any one of Examples 8-10, and optionally, wherein the addressing field comprises 16 bits.

Example 12 includes the subject matter of any one of Examples 1-11, and optionally, wherein the short SSW packet comprises a Radio-Frequency (RF) chain identifier (ID) field comprising an indication of an RF chain of the first wireless station to transmit the short SSW packet.

Example 13 includes the subject matter of Example 12, and optionally, wherein the RF chain ID field comprises two bits.

Example 14 includes the subject matter of any one of Examples 1-13, and optionally, wherein the short SSW packet comprises a Frame Check Sequence (FCS) field comprising four Most Significant Bits (MSBs) of an FCS value.

Example 15 includes the subject matter of any one of Examples 1-14, and optionally, wherein the short SSW packet has a size of 6 octets.

Example 16 includes the subject matter of any one of Examples 1-15, and optionally, wherein the packet type field comprises two bits.

Example 17 includes the subject matter of any one of Examples 1-16, and optionally, wherein the short SSW feedback field comprises 11 bits.

Example 18 includes the subject matter of any one of Examples 1-17, and optionally, wherein the countdown field comprises 11 bits.

Example 19 includes the subject matter of any one of Examples 1-18, and optionally, wherein the direction field comprises a one-bit field having either a value of zero to indicate transmission by the beamforming initiator, or a value of one to indicate transmission by the beamforming responder.

Example 20 includes the subject matter of any one of Examples 1-19, and optionally, wherein the apparatus is configured to cause the first wireless station to transmit the short SSW packet at a Directional Multi-Gigabit (DMG) Control Physical Layer (PHY) mode.

Example 21 includes the subject matter of any one of Examples 1-20, and optionally, wherein the apparatus is configured to cause the first wireless station to transmit the short SSW packet without intervention of a Medium Access Control (MAC) layer of the first wireless station.

Example 22 includes the subject matter of any one of Examples 1-21, and optionally, wherein the apparatus is configured to cause the first wireless station to transmit the short SSW packet as a Physical (PHY) layer frame comprising no Medium Access Control (MAC) header.

Example 23 includes the subject matter of any one of Examples 1-22, and optionally, wherein the first wireless station comprises an Enhanced Directional Multi-Gigabit (EDMG) station.

Example 24 includes the subject matter of Example 23, and optionally, wherein the second wireless station comprises an EDMG station.

Example 25 includes the subject matter of any one of Examples 1-24, and optionally, wherein the directional frequency band comprises a Directional Multi-Gigabit (DMG) band.

Example 26 includes the subject matter of any one of Examples 1-25, and optionally, comprising one or more directional antennas, a memory and a processor.

Example 27 includes a system of wireless communication comprising a first wireless station, the first wireless station comprising one or more directional antennas; a radio; a memory; a processor; a controller configured to cause the first wireless station to generate a short Sector Sweep (SSW) packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and transmit the short SSW packet to a second wireless station over a directional frequency band during beamforming training between the first and second wireless stations.

Example 28 includes the subject matter of Example 27, and optionally, wherein the controller is configured to cause the first wireless station to transmit the short SSW packet during a Responder Sector Sweep (RSS), the short SSW feedback field comprising a value of a countdown field of a previous short SSW packet received in a previous sector sweep.

Example 29 includes the subject matter of Example 28, and optionally, wherein the previous short SSW packet comprises a short SSW packet having a best quality of a plurality of short SSW packets in the previous sector sweep.

Example 30 includes the subject matter of Example 27, and optionally, wherein the controller is configured to cause the first wireless station to transmit the short SSW packet during an Initiator Sector Sweep (ISS), the short SSW feedback field comprising a reserved value.

Example 31 includes the subject matter of any one of Examples 27-30, and optionally, wherein the counter value is to indicate the number of remaining SSW packet transmissions and Long Backoff Inter-Frame Spaces (LBIFSs) to an end of a sector sweep across all antennas of the first wireless station.

Example 32 includes the subject matter of Example 31, and optionally, wherein the controller is configured to cause the first wireless station to transmit the Short SSW packet during a Sector Level Sweep (SLS), and increase the counter value by two for each LBIFS in the SLS.

Example 33 includes the subject matter of any one of Examples 27-32, and optionally, wherein the controller is configured to cause the first wireless station to set the counter value to zero, when the short SSW packet is a last short SSW packet in a sector sweep.

Example 34 includes the subject matter of any one of Examples 27-33, and optionally, wherein the short SSW packet comprises an addressing field to indicate an address of the first wireless station and an address of the second wireless station.

Example 35 includes the subject matter of Example 34, and optionally, wherein the addressing field comprises a hash function of a Medium Access Control (MAC) address of the first wireless station, a MAC address of the second wireless station, and a scrambler seed.

Example 36 includes the subject matter of Example 34, and optionally, wherein the addressing field comprises a concatenation of an Association Identifier (AID) of the first wireless station and an AID of the second wireless station.

Example 37 includes the subject matter of any one of Examples 34-36, and optionally, wherein the addressing field comprises 16 bits.

Example 38 includes the subject matter of any one of Examples 27-37, and optionally, wherein the short SSW packet comprises a Radio-Frequency (RF) chain identifier (ID) field comprising an indication of an RF chain of the first wireless station to transmit the short SSW packet.

Example 39 includes the subject matter of Example 38, and optionally, wherein the RF chain ID field comprises two bits.

Example 40 includes the subject matter of any one of Examples 27-39, and optionally, wherein the short SSW packet comprises a Frame Check Sequence (FCS) field comprising four Most Significant Bits (MSBs) of an FCS value.

Example 41 includes the subject matter of any one of Examples 27-40, and optionally, wherein the short SSW packet has a size of 6 octets.

Example 42 includes the subject matter of any one of Examples 27-41, and optionally, wherein the packet type field comprises two bits.

Example 43 includes the subject matter of any one of Examples 27-42, and optionally, wherein the short SSW feedback field comprises 11 bits.

Example 44 includes the subject matter of any one of Examples 27-43, and optionally, wherein the countdown field comprises 11 bits.

Example 45 includes the subject matter of any one of Examples 27-44, and optionally, wherein the direction field comprises a one-bit field having either a value of zero to indicate transmission by the beamforming initiator, or a value of one to indicate transmission by the beamforming responder.

Example 46 includes the subject matter of any one of Examples 27-45, and optionally, wherein the controller is configured to cause the first wireless station to transmit the short SSW packet at a Directional Multi-Gigabit (DMG) Control Physical Layer (PHY) mode.

Example 47 includes the subject matter of any one of Examples 27-46, and optionally, wherein the controller is configured to cause the first wireless station to transmit the short SSW packet without intervention of a Medium Access Control (MAC) layer of the first wireless station.

Example 48 includes the subject matter of any one of Examples 27-47, and optionally, wherein the controller is configured to cause the first wireless station to transmit the short SSW packet as a Physical (PHY) layer frame comprising no Medium Access Control (MAC) header.

Example 49 includes the subject matter of any one of Examples 27-48, and optionally, wherein the first wireless station comprises an Enhanced Directional Multi-Gigabit (EDMG) station.

Example 50 includes the subject matter of Example 49, and optionally, wherein the second wireless station comprises an EDMG station.

Example 51 includes the subject matter of any one of Examples 27-50, and optionally, wherein the directional frequency band comprises a Directional Multi-Gigabit (DMG) band.

Example 52 includes a method to be performed at a first wireless station, the method comprising generating a short Sector Sweep (SSW) packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and transmitting the short SSW packet to a second wireless station over a directional frequency band during beamforming training between the first and second wireless stations.

Example 53 includes the subject matter of Example 52, and optionally, comprising transmitting the short SSW packet during a Responder Sector Sweep (RSS), the short SSW feedback field comprising a value of a countdown field of a previous short SSW packet received in a previous sector sweep.

Example 54 includes the subject matter of Example 53, and optionally, wherein the previous short SSW packet comprises a short SSW packet having a best quality of a plurality of short SSW packets in the previous sector sweep.

Example 55 includes the subject matter of Example 52, and optionally, comprising transmitting the short SSW packet during an Initiator Sector Sweep (ISS), the short SSW feedback field comprising a reserved value.

Example 56 includes the subject matter of any one of Examples 52-55, and optionally, wherein the counter value is to indicate the number of remaining SSW packet transmissions and Long Backoff Inter-Frame Spaces (LBIFSs) to an end of a sector sweep across all antennas of the first wireless station.

Example 57 includes the subject matter of Example 56, and optionally, comprising transmitting the Short SSW packet during a Sector Level Sweep (SLS), and increasing the counter value by two for each LBIFS in the SLS.

Example 58 includes the subject matter of any one of Examples 52-57, and optionally, comprising setting the counter value to zero, when the short SSW packet is a last short SSW packet in a sector sweep.

Example 59 includes the subject matter of any one of Examples 52-58, and optionally, wherein the short SSW packet comprises an addressing field to indicate an address of the first wireless station and an address of the second wireless station.

Example 60 includes the subject matter of Example 59, and optionally, wherein the addressing field comprises a hash function of a Medium Access Control (MAC) address of the first wireless station, a MAC address of the second wireless station, and a scrambler seed.

Example 61 includes the subject matter of Example 59, and optionally, wherein the addressing field comprises a concatenation of an Association Identifier (AID) of the first wireless station and an AID of the second wireless station.

Example 62 includes the subject matter of any one of Examples 59-61, and optionally, wherein the addressing field comprises 16 bits.

Example 63 includes the subject matter of any one of Examples 52-62, and optionally, wherein the short SSW packet comprises a Radio-Frequency (RF) chain identifier (ID) field comprising an indication of an RF chain of the first wireless station to transmit the short SSW packet.

Example 64 includes the subject matter of Example 63, and optionally, wherein the RF chain ID field comprises two bits.

Example 65 includes the subject matter of any one of Examples 52-64, and optionally, wherein the short SSW packet comprises a Frame Check Sequence (FCS) field comprising four Most Significant Bits (MSBs) of an FCS value.

Example 66 includes the subject matter of any one of Examples 52-65, and optionally, wherein the short SSW packet has a size of 6 octets.

Example 67 includes the subject matter of any one of Examples 52-66, and optionally, wherein the packet type field comprises two bits.

Example 68 includes the subject matter of any one of Examples 52-67, and optionally, wherein the short SSW feedback field comprises 11 bits.

Example 69 includes the subject matter of any one of Examples 52-68, and optionally, wherein the countdown field comprises 11 bits.

Example 70 includes the subject matter of any one of Examples 52-69, and optionally, wherein the direction field comprises a one-bit field having either a value of zero to indicate transmission by the beamforming initiator, or a value of one to indicate transmission by the beamforming responder.

Example 71 includes the subject matter of any one of Examples 52-70, and optionally, comprising transmitting the short SSW packet at a Directional Multi-Gigabit (DMG) Control Physical Layer (PHY) mode.

Example 72 includes the subject matter of any one of Examples 52-71, and optionally, comprising transmitting the short SSW packet without intervention of a Medium Access Control (MAC) layer of the first wireless station.

Example 73 includes the subject matter of any one of Examples 52-72, and optionally, comprising transmitting the short SSW packet as a Physical (PHY) layer frame comprising no Medium Access Control (MAC) header.

Example 74 includes the subject matter of any one of Examples 52-73, and optionally, wherein the first wireless station comprises an Enhanced Directional Multi-Gigabit (EDMG) station.

Example 75 includes the subject matter of Example 74, and optionally, wherein the second wireless station comprises an EDMG station.

Example 76 includes the subject matter of any one of Examples 52-75, and optionally, wherein the directional frequency band comprises a Directional Multi-Gigabit (DMG) band.

Example 77 includes a product comprising one or more tangible computer-readable non-transitory storage media comprising computer-executable instructions operable to, when executed by at least one computer processor, enable the at least one computer processor to implement operations at a first wireless station, the operations comprising generating a short Sector Sweep (SSW) packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and transmitting the short SSW packet to a second wireless station over a directional frequency band during beamforming training between the first and second wireless stations.

Example 78 includes the subject matter of Example 77, and optionally, wherein the operations comprise transmitting the short SSW packet during a Responder Sector Sweep (RSS), the short SSW feedback field comprising a value of a countdown field of a previous short SSW packet received in a previous sector sweep.

Example 79 includes the subject matter of Example 78, and optionally, wherein the previous short SSW packet comprises a short SSW packet having a best quality of a plurality of short SSW packets in the previous sector sweep.

Example 80 includes the subject matter of Example 77, and optionally, wherein the operations comprise transmitting the short SSW packet during an Initiator Sector Sweep (ISS), the short SSW feedback field comprising a reserved value.

Example 81 includes the subject matter of any one of Examples 77-80, and optionally, wherein the counter value is to indicate the number of remaining SSW packet transmissions and Long Backoff Inter-Frame Spaces (LBIFSs) to an end of a sector sweep across all antennas of the first wireless station.

Example 82 includes the subject matter of Example 81, and optionally, wherein the operations comprise transmitting the Short SSW packet during a Sector Level Sweep (SLS), and increasing the counter value by two for each LBIFS in the SLS.

Example 83 includes the subject matter of any one of Examples 77-82, and optionally, wherein the operations comprise setting the counter value to zero, when the short SSW packet is a last short SSW packet in a sector sweep.

Example 84 includes the subject matter of any one of Examples 77-83, and optionally, wherein the short SSW packet comprises an addressing field to indicate an address of the first wireless station and an address of the second wireless station.

Example 85 includes the subject matter of Example 84, and optionally, wherein the addressing field comprises a hash function of a Medium Access Control (MAC) address of the first wireless station, a MAC address of the second wireless station, and a scrambler seed.

Example 86 includes the subject matter of Example 84, and optionally, wherein the addressing field comprises a concatenation of an Association Identifier (AID) of the first wireless station and an AID of the second wireless station.

Example 87 includes the subject matter of any one of Examples 84-86, and optionally, wherein the addressing field comprises 16 bits.

Example 88 includes the subject matter of any one of Examples 77-87, and optionally, wherein the short SSW packet comprises a Radio-Frequency (RF) chain identifier (ID) field comprising an indication of an RF chain of the first wireless station to transmit the short SSW packet.

Example 89 includes the subject matter of Example 88, and optionally, wherein the RF chain ID field comprises two bits.

Example 90 includes the subject matter of any one of Examples 77-89, and optionally, wherein the short SSW packet comprises a Frame Check Sequence (FCS) field comprising four Most Significant Bits (MSBs) of an FCS value.

Example 91 includes the subject matter of any one of Examples 77-90, and optionally, wherein the short SSW packet has a size of 6 octets.

Example 92 includes the subject matter of any one of Examples 77-91, and optionally, wherein the packet type field comprises two bits.

Example 93 includes the subject matter of any one of Examples 77-92, and optionally, wherein the short SSW feedback field comprises 11 bits.

Example 94 includes the subject matter of any one of Examples 77-93, and optionally, wherein the countdown field comprises 11 bits.

Example 95 includes the subject matter of any one of Examples 77-94, and optionally, wherein the direction field comprises a one-bit field having either a value of zero to indicate transmission by the beamforming initiator, or a value of one to indicate transmission by the beamforming responder.

Example 96 includes the subject matter of any one of Examples 77-95, and optionally, wherein the operations comprise transmitting the short SSW packet at a Directional Multi-Gigabit (DMG) Control Physical Layer (PHY) mode.

Example 97 includes the subject matter of any one of Examples 77-96, and optionally, wherein the operations comprise transmitting the short SSW packet without intervention of a Medium Access Control (MAC) layer of the first wireless station.

Example 98 includes the subject matter of any one of Examples 77-97, and optionally, wherein the operations comprise transmitting the short SSW packet as a Physical (PHY) layer frame comprising no Medium Access Control (MAC) header.

Example 99 includes the subject matter of any one of Examples 77-98, and optionally, wherein the first wireless station comprises an Enhanced Directional Multi-Gigabit (EDMG) station.

Example 100 includes the subject matter of Example 99, and optionally, wherein the second wireless station comprises an EDMG station.

Example 101 includes the subject matter of any one of Examples 77-100, and optionally, wherein the directional frequency band comprises a Directional Multi-Gigabit (DMG) band.

Example 102 includes an apparatus of wireless communication by a first wireless station, the apparatus comprising means for generating a short Sector Sweep (SSW) packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and means for transmitting the short SSW packet to a second wireless station over a directional frequency band during beamforming training between the first and second wireless stations.

Example 103 includes the subject matter of Example 102, and optionally, comprising means for transmitting the short SSW packet during a Responder Sector Sweep (RSS), the short SSW feedback field comprising a value of a countdown field of a previous short SSW packet received in a previous sector sweep.

Example 104 includes the subject matter of Example 103, and optionally, wherein the previous short SSW packet comprises a short SSW packet having a best quality of a plurality of short SSW packets in the previous sector sweep.

Example 105 includes the subject matter of Example 102, and optionally, comprising means for transmitting the short SSW packet during an Initiator Sector Sweep (ISS), the short SSW feedback field comprising a reserved value.

Example 106 includes the subject matter of any one of Examples 102-105, and optionally, wherein the counter value is to indicate the number of remaining SSW packet transmissions and Long Backoff Inter-Frame Spaces (LBIFSs) to an end of a sector sweep across all antennas of the first wireless station.

Example 107 includes the subject matter of Example 106, and optionally, comprising means for transmitting the Short SSW packet during a Sector Level Sweep (SLS), and increasing the counter value by two for each LBIFS in the SLS.

Example 108 includes the subject matter of any one of Examples 102-107, and optionally, comprising means for setting the counter value to zero, when the short SSW packet is a last short SSW packet in a sector sweep.

Example 109 includes the subject matter of any one of Examples 102-108, and optionally, wherein the short SSW packet comprises an addressing field to indicate an address of the first wireless station and an address of the second wireless station.

Example 110 includes the subject matter of Example 109, and optionally, wherein the addressing field comprises a hash function of a Medium Access Control (MAC) address of the first wireless station, a MAC address of the second wireless station, and a scrambler seed.

Example 111 includes the subject matter of Example 109, and optionally, wherein the addressing field comprises a concatenation of an Association Identifier (AID) of the first wireless station and an AID of the second wireless station.

Example 112 includes the subject matter of any one of Examples 109-111, and optionally, wherein the addressing field comprises 16 bits.

Example 113 includes the subject matter of any one of Examples 102-112, and optionally, wherein the short SSW packet comprises a Radio-Frequency (RF) chain identifier (ID) field comprising an indication of an RF chain of the first wireless station to transmit the short SSW packet.

Example 114 includes the subject matter of Example 113, and optionally, wherein the RF chain ID field comprises two bits.

Example 115 includes the subject matter of any one of Examples 102-114, and optionally, wherein the short SSW packet comprises a Frame Check Sequence (FCS) field comprising four Most Significant Bits (MSBs) of an FCS value.

Example 116 includes the subject matter of any one of Examples 102-115, and optionally, wherein the short SSW packet has a size of 6 octets.

Example 117 includes the subject matter of any one of Examples 102-116, and optionally, wherein the packet type field comprises two bits.

Example 118 includes the subject matter of any one of Examples 102-117, and optionally, wherein the short SSW feedback field comprises 11 bits.

Example 119 includes the subject matter of any one of Examples 102-118, and optionally, wherein the countdown field comprises 11 bits.

Example 120 includes the subject matter of any one of Examples 102-119, and optionally, wherein the direction field comprises a one-bit field having either a value of zero to indicate transmission by the beamforming initiator, or a value of one to indicate transmission by the beamforming responder.

Example 121 includes the subject matter of any one of Examples 102-120, and optionally, comprising means for transmitting the short SSW packet at a Directional Multi-Gigabit (DMG) Control Physical Layer (PHY) mode.

Example 122 includes the subject matter of any one of Examples 102-121, and optionally, comprising means for transmitting the short SSW packet without intervention of a Medium Access Control (MAC) layer of the first wireless station.

Example 123 includes the subject matter of any one of Examples 102-122, and optionally, comprising means for transmitting the short SSW packet as a Physical (PHY) layer frame comprising no Medium Access Control (MAC) header.

Example 124 includes the subject matter of any one of Examples 102-123, and optionally, wherein the first wireless station comprises an Enhanced Directional Multi-Gigabit (EDMG) station.

Example 125 includes the subject matter of Example 124, and optionally, wherein the second wireless station comprises an EDMG station.

Example 126 includes the subject matter of any one of Examples 102-125, and optionally, wherein the directional frequency band comprises a Directional Multi-Gigabit (DMG) band.

Example 127 includes an apparatus comprising circuitry and logic configured to cause a first wireless station to process a short Sector Sweep (SSW) packet received from a second wireless station over a directional frequency band during beamforming training between the first and second wireless stations, the short SSW packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and determine one or more beamforming parameters based on the short SSW packet.

Example 128 includes the subject matter of Example 127, and optionally, wherein the short SSW packet comprises a short SSW packet of a Responder Sector Sweep (RSS), the short SSW feedback field comprising a value of a countdown field of a previous short SSW packet transmitted by the first wireless station in a previous sector sweep.

Example 129 includes the subject matter of Example 128, and optionally, wherein the previous short SSW packet comprises a short SSW packet having a best quality of a plurality of short SSW packets in the previous sector sweep.

Example 130 includes the subject matter of Example 127, and optionally, wherein the short SSW packet comprises a short SSW packet of an Initiator Sector Sweep (ISS), the short SSW feedback field comprising a reserved value.

Example 131 includes the subject matter of any one of Examples 127-130, and optionally, wherein the counter value is to indicate the number of remaining SSW packet transmissions and Long Backoff Inter-Frame Spaces (LBIFSs) to an end of a sector sweep across all antennas of the second wireless station.

Example 132 includes the subject matter of any one of Examples 127-131, and optionally, wherein the apparatus is configured to cause the first wireless station to determine that the short SSW packet is a last short SSW packet in a sector sweep, when the counter value to zero.

Example 133 includes the subject matter of any one of Examples 127-132, and optionally, wherein the short SSW packet comprises an addressing field to indicate an address of the first wireless station and an address of the second wireless station.

Example 134 includes the subject matter of Example 133, and optionally, wherein the addressing field comprises a hash function of a Medium Access Control (MAC) address of the first wireless station, a MAC address of the second wireless station, and a scrambler seed.

Example 135 includes the subject matter of Example 133, and optionally, wherein the addressing field comprises a concatenation of an Association Identifier (AID) of the second wireless station and an AID of the first wireless station.

Example 136 includes the subject matter of any one of Examples 133-135, and optionally, wherein the addressing field comprises 16 bits.

Example 137 includes the subject matter of any one of Examples 127-136, and optionally, wherein the short SSW packet comprises a Radio-Frequency (RF) chain identifier (ID) field comprising an indication of an RF chain of the second wireless station to transmit the short SSW packet.

Example 138 includes the subject matter of Example 137, and optionally, wherein the RF chain ID field comprises two bits.

Example 139 includes the subject matter of any one of Examples 127-138, and optionally, wherein the short SSW packet comprises a Frame Check Sequence (FCS) field comprising four Most Significant Bits (MSBs) of an FCS value.

Example 140 includes the subject matter of any one of Examples 127-139, and optionally, wherein the short SSW packet has a size of 6 octets.

Example 141 includes the subject matter of any one of Examples 127-140, and optionally, wherein the packet type field comprises two bits.

Example 142 includes the subject matter of any one of Examples 127-141, and optionally, wherein the short SSW feedback field comprises 11 bits.

Example 143 includes the subject matter of any one of Examples 127-142, and optionally, wherein the countdown field comprises 11 bits.

Example 144 includes the subject matter of any one of Examples 127-143, and optionally, wherein the direction field comprises a one-bit field having either a value of zero to indicate transmission by the beamforming initiator, or a value of one to indicate transmission by the beamforming responder.

Example 145 includes the subject matter of any one of Examples 127-144, and optionally, wherein the apparatus is configured to cause the first wireless station to process the short SSW packet at a Directional Multi-Gigabit (DMG) Control Physical Layer (PHY) mode.

Example 146 includes the subject matter of any one of Examples 127-145, and optionally, wherein the apparatus is configured to cause the first wireless station to process the short SSW packet without intervention of a Medium Access Control (MAC) layer of the first wireless station.

Example 147 includes the subject matter of any one of Examples 127-146, and optionally, wherein the apparatus is configured to cause the first wireless station to process the short SSW packet as a Physical (PHY) layer frame comprising no Medium Access Control (MAC) header.

Example 148 includes the subject matter of any one of Examples 127-147, and optionally, wherein the first wireless station comprises an Enhanced Directional Multi-Gigabit (EDMG) station.

Example 149 includes the subject matter of Example 148, and optionally, wherein the second wireless station comprises an EDMG station.

Example 150 includes the subject matter of any one of Examples 127-149, and optionally, wherein the directional frequency band comprises a Directional Multi-Gigabit (DMG) band.

Example 151 includes the subject matter of any one of Examples 127-150, and optionally, comprising one or more directional antennas, a memory and a processor.

Example 152 includes a system of wireless communication comprising a first wireless station, the first wireless station comprising one or more directional antennas; a radio; a memory; a processor; a controller configured to cause the first wireless station to process a short Sector Sweep (SSW) packet received from a second wireless station over a directional frequency band during beamforming training between the first and second wireless stations, the short SSW packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and determine one or more beamforming parameters based on the short SSW packet.

Example 153 includes the subject matter of Example 152, and optionally, wherein the short SSW packet comprises a short SSW packet of a Responder Sector Sweep (RSS), the short SSW feedback field comprising a value of a countdown field of a previous short SSW packet transmitted by the first wireless station in a previous sector sweep.

Example 154 includes the subject matter of Example 153, and optionally, wherein the previous short SSW packet comprises a short SSW packet having a best quality of a plurality of short SSW packets in the previous sector sweep.

Example 155 includes the subject matter of Example 152, and optionally, wherein the short SSW packet comprises a short SSW packet of an Initiator Sector Sweep (ISS), the short SSW feedback field comprising a reserved value.

Example 156 includes the subject matter of any one of Examples 152-155, and optionally, wherein the counter value is to indicate the number of remaining SSW packet transmissions and Long Backoff Inter-Frame Spaces (LBIFSs) to an end of a sector sweep across all antennas of the second wireless station.

Example 157 includes the subject matter of any one of Examples 152-156, and optionally, wherein the controller is configured to cause the first wireless station to determine that the short SSW packet is a last short SSW packet in a sector sweep, when the counter value to zero.

Example 158 includes the subject matter of any one of Examples 152-157, and optionally, wherein the short SSW packet comprises an addressing field to indicate an address of the first wireless station and an address of the second wireless station.

Example 159 includes the subject matter of Example 158, and optionally, wherein the addressing field comprises a hash function of a Medium Access Control (MAC) address of the first wireless station, a MAC address of the second wireless station, and a scrambler seed.

Example 160 includes the subject matter of Example 158, and optionally, wherein the addressing field comprises a concatenation of an Association Identifier (AID) of the second wireless station and an AID of the first wireless station.

Example 161 includes the subject matter of any one of Examples 158-160, and optionally, wherein the addressing field comprises 16 bits.

Example 162 includes the subject matter of any one of Examples 152-161, and optionally, wherein the short SSW packet comprises a Radio-Frequency (RF) chain identifier (ID) field comprising an indication of an RF chain of the second wireless station to transmit the short SSW packet.

Example 163 includes the subject matter of Example 162, and optionally, wherein the RF chain ID field comprises two bits.

Example 164 includes the subject matter of any one of Examples 152-163, and optionally, wherein the short SSW packet comprises a Frame Check Sequence (FCS) field comprising four Most Significant Bits (MSBs) of an FCS value.

Example 165 includes the subject matter of any one of Examples 152-164, and optionally, wherein the short SSW packet has a size of 6 octets.

Example 166 includes the subject matter of any one of Examples 152-165, and optionally, wherein the packet type field comprises two bits.

Example 167 includes the subject matter of any one of Examples 152-166, and optionally, wherein the short SSW feedback field comprises 11 bits.

Example 168 includes the subject matter of any one of Examples 152-167, and optionally, wherein the countdown field comprises 11 bits.

Example 169 includes the subject matter of any one of Examples 152-168, and optionally, wherein the direction field comprises a one-bit field having either a value of zero to indicate transmission by the beamforming initiator, or a value of one to indicate transmission by the beamforming responder.

Example 170 includes the subject matter of any one of Examples 152-169, and optionally, wherein the controller is configured to cause the first wireless station to process the short SSW packet at a Directional Multi-Gigabit (DMG) Control Physical Layer (PHY) mode.

Example 171 includes the subject matter of any one of Examples 152-170, and optionally, wherein the controller is configured to cause the first wireless station to process the short SSW packet without intervention of a Medium Access Control (MAC) layer of the first wireless station.

Example 172 includes the subject matter of any one of Examples 152-171, and optionally, wherein the controller is configured to cause the first wireless station to process the short SSW packet as a Physical (PHY) layer frame comprising no Medium Access Control (MAC) header.

Example 173 includes the subject matter of any one of Examples 152-172, and optionally, wherein the first wireless station comprises an Enhanced Directional Multi-Gigabit (EDMG) station.

Example 174 includes the subject matter of Example 173, and optionally, wherein the second wireless station comprises an EDMG station.

Example 175 includes the subject matter of any one of Examples 152-174, and optionally, wherein the directional frequency band comprises a Directional Multi-Gigabit (DMG) band.

Example 176 includes a method to be performed at a first wireless station, the method comprising processing a short Sector Sweep (SSW) packet received from a second wireless station over a directional frequency band during beamforming training between the first and second wireless stations, the short SSW packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and determining one or more beamforming parameters based on the short SSW packet.

Example 177 includes the subject matter of Example 176, and optionally, wherein the short SSW packet comprises a short SSW packet of a Responder Sector Sweep (RSS), the short SSW feedback field comprising a value of a countdown field of a previous short SSW packet transmitted by the first wireless station in a previous sector sweep.

Example 178 includes the subject matter of Example 177, and optionally, wherein the previous short SSW packet comprises a short SSW packet having a best quality of a plurality of short SSW packets in the previous sector sweep.

Example 179 includes the subject matter of Example 176, and optionally, wherein the short SSW packet comprises a short SSW packet of an Initiator Sector Sweep (ISS), the short SSW feedback field comprising a reserved value.

Example 180 includes the subject matter of any one of Examples 176-179, and optionally, wherein the counter value is to indicate the number of remaining SSW packet transmissions and Long Backoff Inter-Frame Spaces (LBIFSs) to an end of a sector sweep across all antennas of the second wireless station.

Example 181 includes the subject matter of any one of Examples 176-180, and optionally, comprising determining that the short SSW packet is a last short SSW packet in a sector sweep, when the counter value to zero.

Example 182 includes the subject matter of any one of Examples 176-181, and optionally, wherein the short SSW packet comprises an addressing field to indicate an address of the first wireless station and an address of the second wireless station.

Example 183 includes the subject matter of Example 182, and optionally, wherein the addressing field comprises a hash function of a Medium Access Control (MAC) address of the first wireless station, a MAC address of the second wireless station, and a scrambler seed.

Example 184 includes the subject matter of Example 182, and optionally, wherein the addressing field comprises a concatenation of an Association Identifier (AID) of the second wireless station and an AID of the first wireless station.

Example 185 includes the subject matter of any one of Examples 182-184, and optionally, wherein the addressing field comprises 16 bits.

Example 186 includes the subject matter of any one of Examples 176-185, and optionally, wherein the short SSW packet comprises a Radio-Frequency (RF) chain identifier (ID) field comprising an indication of an RF chain of the second wireless station to transmit the short SSW packet.

Example 187 includes the subject matter of Example 186, and optionally, wherein the RF chain ID field comprises two bits.

Example 188 includes the subject matter of any one of Examples 176-187, and optionally, wherein the short SSW packet comprises a Frame Check Sequence (FCS) field comprising four Most Significant Bits (MSBs) of an FCS value.

Example 189 includes the subject matter of any one of Examples 176-188, and optionally, wherein the short SSW packet has a size of 6 octets.

Example 190 includes the subject matter of any one of Examples 176-189, and optionally, wherein the packet type field comprises two bits.

Example 191 includes the subject matter of any one of Examples 176-190, and optionally, wherein the short SSW feedback field comprises 11 bits.

Example 192 includes the subject matter of any one of Examples 176-191, and optionally, wherein the countdown field comprises 11 bits.

Example 193 includes the subject matter of any one of Examples 176-192, and optionally, wherein the direction field comprises a one-bit field having either a value of zero to indicate transmission by the beamforming initiator, or a value of one to indicate transmission by the beamforming responder.

Example 194 includes the subject matter of any one of Examples 176-193, and optionally, comprising processing the short SSW packet at a Directional Multi-Gigabit (DMG) Control Physical Layer (PHY) mode.

Example 195 includes the subject matter of any one of Examples 176-194, and optionally, comprising processing the short SSW packet without intervention of a Medium Access Control (MAC) layer of the first wireless station.

Example 196 includes the subject matter of any one of Examples 176-195, and optionally, comprising processing the short SSW packet as a Physical (PHY) layer frame comprising no Medium Access Control (MAC) header.

Example 197 includes the subject matter of any one of Examples 176-196, and optionally, wherein the first wireless station comprises an Enhanced Directional Multi-Gigabit (EDMG) station.

Example 198 includes the subject matter of Example 197, and optionally, wherein the second wireless station comprises an EDMG station.

Example 199 includes the subject matter of any one of Examples 176-198, and optionally, wherein the directional frequency band comprises a Directional Multi-Gigabit (DMG) band.

Example 200 includes a product comprising one or more tangible computer-readable non-transitory storage media comprising computer-executable instructions operable to, when executed by at least one computer processor, enable the at least one computer processor to implement operations at a first wireless station, the operations comprising processing a short Sector Sweep (SSW) packet received from a second wireless station over a directional frequency band during beamforming training between the first and second wireless stations, the short SSW packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and determining one or more beamforming parameters based on the short SSW packet.

Example 201 includes the subject matter of Example 200, and optionally, wherein the short SSW packet comprises a short SSW packet of a Responder Sector Sweep (RSS), the short SSW feedback field comprising a value of a countdown field of a previous short SSW packet transmitted by the first wireless station in a previous sector sweep.

Example 202 includes the subject matter of Example 201, and optionally, wherein the previous short SSW packet comprises a short SSW packet having a best quality of a plurality of short SSW packets in the previous sector sweep.

Example 203 includes the subject matter of Example 200, and optionally, wherein the short SSW packet comprises a short SSW packet of an Initiator Sector Sweep (ISS), the short SSW feedback field comprising a reserved value.

Example 204 includes the subject matter of any one of Examples 200-203, and optionally, wherein the counter value is to indicate the number of remaining SSW packet transmissions and Long Backoff Inter-Frame Spaces (LBIFSs) to an end of a sector sweep across all antennas of the second wireless station.

Example 205 includes the subject matter of any one of Examples 200-204, and optionally, wherein the operations comprise determining that the short SSW packet is a last short SSW packet in a sector sweep, when the counter value to zero.

Example 206 includes the subject matter of any one of Examples 200-205, and optionally, wherein the short SSW packet comprises an addressing field to indicate an address of the first wireless station and an address of the second wireless station.

Example 207 includes the subject matter of Example 206, and optionally, wherein the addressing field comprises a hash function of a Medium Access Control (MAC) address of the first wireless station, a MAC address of the second wireless station, and a scrambler seed.

Example 208 includes the subject matter of Example 206, and optionally, wherein the addressing field comprises a concatenation of an Association Identifier (AID) of the second wireless station and an AID of the first wireless station.

Example 209 includes the subject matter of any one of Examples 206-208, and optionally, wherein the addressing field comprises 16 bits.

Example 210 includes the subject matter of any one of Examples 200-209, and optionally, wherein the short SSW packet comprises a Radio-Frequency (RF) chain identifier (ID) field comprising an indication of an RF chain of the second wireless station to transmit the short SSW packet.

Example 211 includes the subject matter of Example 210, and optionally, wherein the RF chain ID field comprises two bits.

Example 212 includes the subject matter of any one of Examples 200-211, and optionally, wherein the short SSW packet comprises a Frame Check Sequence (FCS) field comprising four Most Significant Bits (MSBs) of an FCS value.

Example 213 includes the subject matter of any one of Examples 200-212, and optionally, wherein the short SSW packet has a size of 6 octets.

Example 214 includes the subject matter of any one of Examples 200-213, and optionally, wherein the packet type field comprises two bits.

Example 215 includes the subject matter of any one of Examples 200-214, and optionally, wherein the short SSW feedback field comprises 11 bits.

Example 216 includes the subject matter of any one of Examples 200-215, and optionally, wherein the countdown field comprises 11 bits.

Example 217 includes the subject matter of any one of Examples 200-216, and optionally, wherein the direction field comprises a one-bit field having either a value of zero to indicate transmission by the beamforming initiator, or a value of one to indicate transmission by the beamforming responder.

Example 218 includes the subject matter of any one of Examples 200-217, and optionally, wherein the operations comprise processing the short SSW packet at a Directional Multi-Gigabit (DMG) Control Physical Layer (PHY) mode.

Example 219 includes the subject matter of any one of Examples 200-218, and optionally, wherein the operations comprise processing the short SSW packet without intervention of a Medium Access Control (MAC) layer of the first wireless station.

Example 220 includes the subject matter of any one of Examples 200-219, and optionally, wherein the operations comprise processing the short SSW packet as a Physical (PHY) layer frame comprising no Medium Access Control (MAC) header.

Example 221 includes the subject matter of any one of Examples 200-220, and optionally, wherein the first wireless station comprises an Enhanced Directional Multi-Gigabit (EDMG) station.

Example 222 includes the subject matter of Example 221, and optionally, wherein the second wireless station comprises an EDMG station.

Example 223 includes the subject matter of any one of Examples 200-222, and optionally, wherein the directional frequency band comprises a Directional Multi-Gigabit (DMG) band.

Example 224 includes an apparatus of wireless communication by a first wireless station, the apparatus comprising means for processing a short Sector Sweep (SSW) packet received from a second wireless station over a directional frequency band during beamforming training between the first and second wireless stations, the short SSW packet comprising at least a packet type field, a countdown field, a short SSW feedback field, and a direction field, the packet type field comprising a value to indicate a Short SSW packet type, the countdown field comprising a counter value to indicate a number of remaining short SSW packet transmissions, the direction field to indicate whether transmission of the short SSW packet is from a beamforming initiator or a beamforming responder; and means for determining one or more beamforming parameters based on the short SSW packet.

Example 225 includes the subject matter of Example 224, and optionally, wherein the short SSW packet comprises a short SSW packet of a Responder Sector Sweep (RSS), the short SSW feedback field comprising a value of a countdown field of a previous short SSW packet transmitted by the first wireless station in a previous sector sweep.

Example 226 includes the subject matter of Example 225, and optionally, wherein the previous short SSW packet comprises a short SSW packet having a best quality of a plurality of short SSW packets in the previous sector sweep.

Example 227 includes the subject matter of Example 224, and optionally, wherein the short SSW packet comprises a short SSW packet of an Initiator Sector Sweep (ISS), the short SSW feedback field comprising a reserved value.

Example 228 includes the subject matter of any one of Examples 224-227, and optionally, wherein the counter value is to indicate the number of remaining SSW packet transmissions and Long Backoff Inter-Frame Spaces (LBIFSs) to an end of a sector sweep across all antennas of the second wireless station.

Example 229 includes the subject matter of any one of Examples 224-228, and optionally, comprising means for determining that the short SSW packet is a last short SSW packet in a sector sweep, when the counter value to zero.

Example 230 includes the subject matter of any one of Examples 224-229, and optionally, wherein the short SSW packet comprises an addressing field to indicate an address of the first wireless station and an address of the second wireless station.

Example 231 includes the subject matter of Example 230, and optionally, wherein the addressing field comprises a hash function of a Medium Access Control (MAC) address of the first wireless station, a MAC address of the second wireless station, and a scrambler seed.

Example 232 includes the subject matter of Example 230, and optionally, wherein the addressing field comprises a concatenation of an Association Identifier (AID) of the second wireless station and an AID of the first wireless station.

Example 233 includes the subject matter of any one of Examples 230-232, and optionally, wherein the addressing field comprises 16 bits.

Example 234 includes the subject matter of any one of Examples 224-233, and optionally, wherein the short SSW packet comprises a Radio-Frequency (RF) chain identifier (ID) field comprising an indication of an RF chain of the second wireless station to transmit the short SSW packet.

Example 235 includes the subject matter of Example 234, and optionally, wherein the RF chain ID field comprises two bits.

Example 236 includes the subject matter of any one of Examples 224-235, and optionally, wherein the short SSW packet comprises a Frame Check Sequence (FCS) field comprising four Most Significant Bits (MSBs) of an FCS value.

Example 237 includes the subject matter of any one of Examples 224-236, and optionally, wherein the short SSW packet has a size of 6 octets.

Example 238 includes the subject matter of any one of Examples 224-237, and optionally, wherein the packet type field comprises two bits.

Example 239 includes the subject matter of any one of Examples 224-238, and optionally, wherein the short SSW feedback field comprises 11 bits.

Example 240 includes the subject matter of any one of Examples 224-239, and optionally, wherein the countdown field comprises 11 bits.

Example 241 includes the subject matter of any one of Examples 224-240, and optionally, wherein the direction field comprises a one-bit field having either a value of zero to indicate transmission by the beamforming initiator, or a value of one to indicate transmission by the beamforming responder.

Example 242 includes the subject matter of any one of Examples 224-241, and optionally, comprising means for processing the short SSW packet at a Directional Multi-Gigabit (DMG) Control Physical Layer (PHY) mode.

Example 243 includes the subject matter of any one of Examples 224-242, and optionally, comprising means for processing the short SSW packet without intervention of a Medium Access Control (MAC) layer of the first wireless station.

Example 244 includes the subject matter of any one of Examples 224-243, and optionally, comprising means for processing the short SSW packet as a Physical (PHY) layer frame comprising no Medium Access Control (MAC) header.

Example 245 includes the subject matter of any one of Examples 224-244, and optionally, wherein the first wireless station comprises an Enhanced Directional Multi-Gigabit (EDMG) station.

Example 246 includes the subject matter of Example 245, and optionally, wherein the second wireless station comprises an EDMG station.

Example 247 includes the subject matter of any one of Examples 224-246, and optionally, wherein the directional frequency band comprises a Directional Multi-Gigabit (DMG) band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a first wireless station to:
    generate a short Sector Sweep (SSW) packet comprising at least a packet type field, a countdown field, and a direction field, the packet type field comprising a value to indicate a Short SSW packet type, the countdown field comprising a counter value to indicate a number of remaining short SSW packet transmissions and Long Backoff Inter-Frame Spaces (LBIFSs) to an end of a sector sweep across all antennas of the first wireless station, the counter value increased by two for each LBIFS in a Sector Level Sweep (SLS), the direction field to indicate whether transmission of the short SSW packet is from a beamforming initiator or a beamforming responder; and
    transmit the short SSW packet to a second wireless station over a directional frequency band during the SLS in a beamforming training between the first and second wireless stations.

2. The apparatus of claim 1 configured to cause the first wireless station to transmit the short SSW packet during a Responder Sector Sweep (RSS), the short SSW packet comprising a short SSW feedback field comprising a value of a countdown field of a previous short SSW packet received in a previous sector sweep.

3. The apparatus of claim 2, wherein the previous short SSW packet comprises a short SSW packet having a best quality of a plurality of short SSW packets in the previous sector sweep.

4. The apparatus of claim 1 configured to cause the first wireless station to transmit the short SSW packet during an Initiator Sector Sweep (ISS).

5. The apparatus of claim 1, wherein the direction field comprises a one-bit field having either a value of zero to indicate transmission by the beamforming initiator, or a value of one to indicate transmission by the beamforming responder.

6. The apparatus of claim 1 configured to cause the first wireless station to set the counter value to zero, when the short SSW packet is a last short SSW packet in the sector sweep.

7. The apparatus of claim 1, wherein the short SSW packet comprises an addressing field to indicate an address of the first wireless station and an address of the second wireless station.

8. The apparatus of claim 1, wherein the short SSW packet comprises a Radio-Frequency (RF) chain identifier (ID) field comprising an indication of an RF chain of the first wireless station to transmit the short SSW packet.

9. The apparatus of claim 1, wherein the short SSW packet comprises a Frame Check Sequence (FCS) field comprising four Most Significant Bits (MSBs) of an FCS value.

10. The apparatus of claim 1, wherein the short SSW packet has a size of 6 octets.

11. The apparatus of claim 1 configured to cause the first wireless station to transmit the short SSW packet at a Directional Multi-Gigabit (DMG) Control Physical Layer (PHY) mode.

12. The apparatus of claim 1 configured to cause the first wireless station to transmit the short SSW packet without intervention of a Medium Access Control (MAC) layer of the first wireless station.

13. The apparatus of claim 1 configured to cause the first wireless station to transmit the short SSW packet as a Physical (PHY) layer frame comprising no Medium Access Control (MAC) header.

14. The apparatus of claim 1 comprising one or more directional antennas, a memory and a processor.

15. A product comprising one or more tangible computer-readable non-transitory storage media comprising computer-executable instructions operable to, when executed by at least one computer processor, enable the at least one processor to cause a first wireless station to:
    generate a short Sector Sweep (SSW) packet comprising at least a packet type field, a countdown field, and a direction field, the packet type field comprising a value to indicate a Short SSW packet type, the countdown field comprising a counter value to indicate a number of remaining short SSW packet transmissions and Long Backoff Inter-Frame Spaces (LBIFSs) to an end of a sector sweep, across all antennas of the first wireless station, the counter value increased by two for each LBIFS in a Sector Level Sweep (SLS), the direction field to indicate whether transmission of the short SSW packet is from a beamforming initiator or a beamforming responder; and
    transmit the short SSW packet to a second wireless station over a directional frequency band during the SLS in a beamforming training between the first and second wireless stations.

16. The product of claim 15, wherein the instructions, when executed, cause the first wireless station to transmit the short SSW packet during a Responder Sector Sweep (RSS), the short SSW packet comprising a short SSW feedback field comprising a value of a countdown field of a previous short SSW packet received in a previous sector sweep.

17. The product of claim 15, wherein the short SSW packet comprises a Radio-Frequency (RF) chain identifier (ID) field comprising an indication of an RF chain of the first wireless station to transmit the short SSW packet.

18. An apparatus comprising circuitry and logic configured to cause a first wireless station to:
    process a short Sector Sweep (SSW) packet received from a second wireless station over a directional frequency band during a Sector Level Sweep (SLS) in a beamforming training between the first and second wireless stations, the short SSW packet comprising at least a packet type field, a countdown field, and a direction field, the packet type field comprising a value to indicate a Short SSW packet type, the countdown field comprising a counter value to indicate a number of remaining short SSW packet transmissions and Long Backoff Inter-Frame Spaces (LBIFSs) to an end of a sector sweep across all antennas of the second wireless station, the counter value increased by two for each LBIFS in the SLS, the direction field to indicate whether transmission of the short SSW packet is from a beamforming initiator or a beamforming responder; and determine one or more beamforming parameters based on the short SSW packet.

19. The apparatus of claim 18, wherein the short SSW packet comprises a short SSW packet of a Responder Sector Sweep (RSS), the short SSW packet comprising a short SSW feedback field comprising a value of a countdown field of a previous short SSW packet transmitted by the first wireless station in a previous sector sweep.

20. The apparatus of claim 18, wherein the short SSW packet comprises a short SSW packet of an Initiator Sector Sweep (ISS).

21. The apparatus of claim 18 configured to cause the first wireless station to process the short SSW packet without intervention of a Medium Access Control (MAC) layer of the first wireless station.

22. The apparatus of claim 18 configured to cause the first wireless station to process the short SSW packet as a Physical (PHY) layer frame comprising no Medium Access Control (MAC) header.

23. The apparatus of claim 18 comprising one or more directional antennas, a memory and a processor.

24. A product comprising one or more tangible computer-readable non-transitory storage media comprising computer-executable instructions operable to, when executed by at least one processor, enable the at least one processor to cause a first wireless station to:

process a short Sector Sweep (SSW) packet received from a second wireless station over a directional frequency band during a Sector Level Sweep (SLS) in a beamforming training between the first and second wireless stations, the short SSW packet comprising at least a packet type field, a countdown field, and a direction field, the packet type field comprising a value to indicate a Short SSW packet type, the countdown field comprising a counter value to indicate a number of remaining short SSW packet transmissions and Long Backoff Inter-Frame Spaces (LBIFSs) to an end of a sector sweep across all antennas of the second wireless station, the counter value increased by two for each LBIFS in the SLS, the direction field to indicate whether transmission of the short SSW packet is from a beamforming initiator or a beamforming responder; and determine one or more beamforming parameters based on the short SSW packet.

25. The product of claim 24, wherein the short SSW packet comprises a short SSW packet of a Responder Sector Sweep (RSS), the short SSW packet comprising a short SSW feedback field comprising a value of a countdown field of a previous short SSW packet transmitted by the first wireless station in a previous sector sweep.

* * * * *

UNITED STATES PATENT AND TRADEMARK OFFICE
CERTIFICATE OF CORRECTION

PATENT NO. : 10,034,218 B2
APPLICATION NO. : 15/199468
DATED : July 24, 2018
INVENTOR(S) : Carlos Cordeiro et al.

It is certified that error appears in the above-identified patent and that said Letters Patent is hereby corrected as shown below:

In the Claims

In Column 46, Line 41, in Claim 15, delete "sector sweep, across" and insert -- sector sweep across --, therefor.

Signed and Sealed this
Fourth Day of September, 2018

Andrei Iancu
*Director of the United States Patent and Trademark Office*